United States Patent
Chang

(10) Patent No.: US 6,974,226 B2
(45) Date of Patent: Dec. 13, 2005

(54) MAGNETICALLY ATTACHABLE LIGHT ASSEMBLY FOR GLASSES

(75) Inventor: Hsien-Tsung Chang, Chiayi (TW)

(73) Assignee: Contour Optik, Inc., Chiayi (TW)

( * ) Notice: Subject to any disclaimer, the term of this patent is extended or adjusted under 35 U.S.C. 154(b) by 27 days.

(21) Appl. No.: 10/742,286

(22) Filed: Dec. 19, 2003

(65) Prior Publication Data

US 2004/0150986 A1 Aug. 5, 2004

(30) Foreign Application Priority Data

Jan. 30, 2003 (TW) ............................... 92201923 U
Feb. 27, 2003 (TW) ............................... 92203036 U
Apr. 8, 2003 (TW) ............................... 92205463 U

(51) Int. Cl.[7] ............................................. F21V 21/08
(52) U.S. Cl. ...................... 362/103; 362/191; 362/647; 362/368; 362/372; 362/396; 362/398
(58) Field of Search ............................... 362/103, 105, 362/184, 191, 190, 647, 368, 370, 372, 396, 362/398, 226; 351/41, 158

(56) References Cited

U.S. PATENT DOCUMENTS

| | | | |
|---|---|---|---|
| 320,558 A * | 6/1885 | Hull | ............................... 351/158 |
| 669,949 A | 3/1901 | Underwood | |
| 1,255,265 A | 2/1918 | Zachara | |
| 2,638,532 A | 5/1953 | Brady | |
| 2,904,670 A | 9/1959 | Calmes | |
| 3,060,308 A | 10/1962 | Fortuna | |
| 4,254,451 A | 3/1981 | Cochran, Jr. | |
| 4,283,127 A | 8/1981 | Roxenwinkel et al. | |
| 4,822,160 A | 4/1989 | Tsai | |
| 4,822,161 A | 4/1989 | Jimmy | |
| 5,946,071 A | 8/1999 | Feldman | |
| 6,343,858 B1 | 2/2002 | Zelman | |
| 6,764,194 B1 * | 7/2004 | Cooper | ...................... 362/105 |

FOREIGN PATENT DOCUMENTS

| | | |
|---|---|---|
| CN | 88203065 | 2/1988 |
| CN | 89214222.7 | 7/1989 |
| CN | 90208199.3 | 6/1990 |
| EP | 1134491 | 9/2001 |
| GB | 1467982 | 3/1977 |
| JP | 02-181722 | 7/1990 |
| JP | 09-017204 | 1/1997 |
| JP | 10-161072 | 6/1998 |
| JP | 2000-039595 | 2/2000 |
| TW | 484711 | 4/2002 |

* cited by examiner

*Primary Examiner*—Sandra O'Shea
*Assistant Examiner*—Sharon Payne

(57) ABSTRACT

A light assembly that can be magnetically attached to a pair of glasses. The assembly has a light source and a housing, which has a first magnetic element. When the light assembly is attached to a pair of glasses, the person wearing the glasses would not block the light emitted from the light assembly; the first magnetic element is magnetically coupled to a second magnetic element; and at least a portion of the housing extends over at least a portion of the glasses to provide support for the light assembly, if necessary.

19 Claims, 25 Drawing Sheets

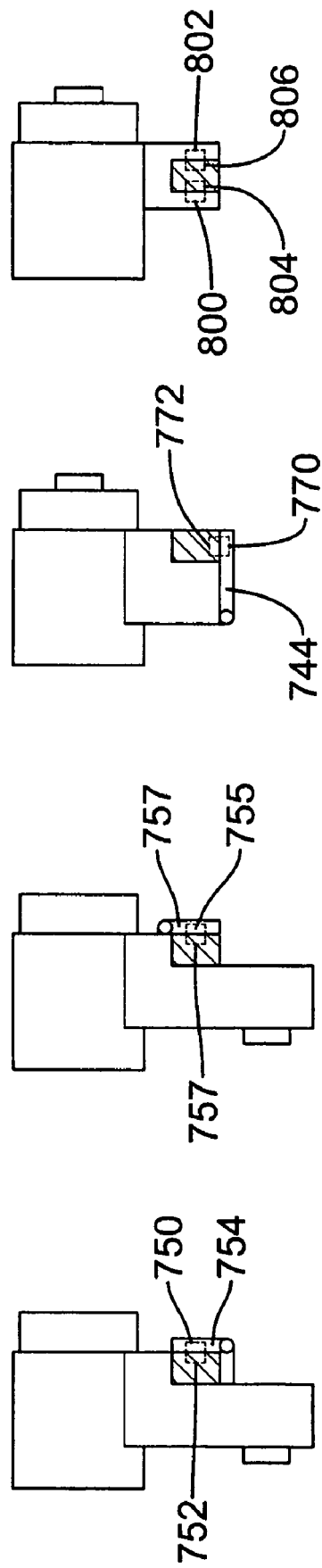

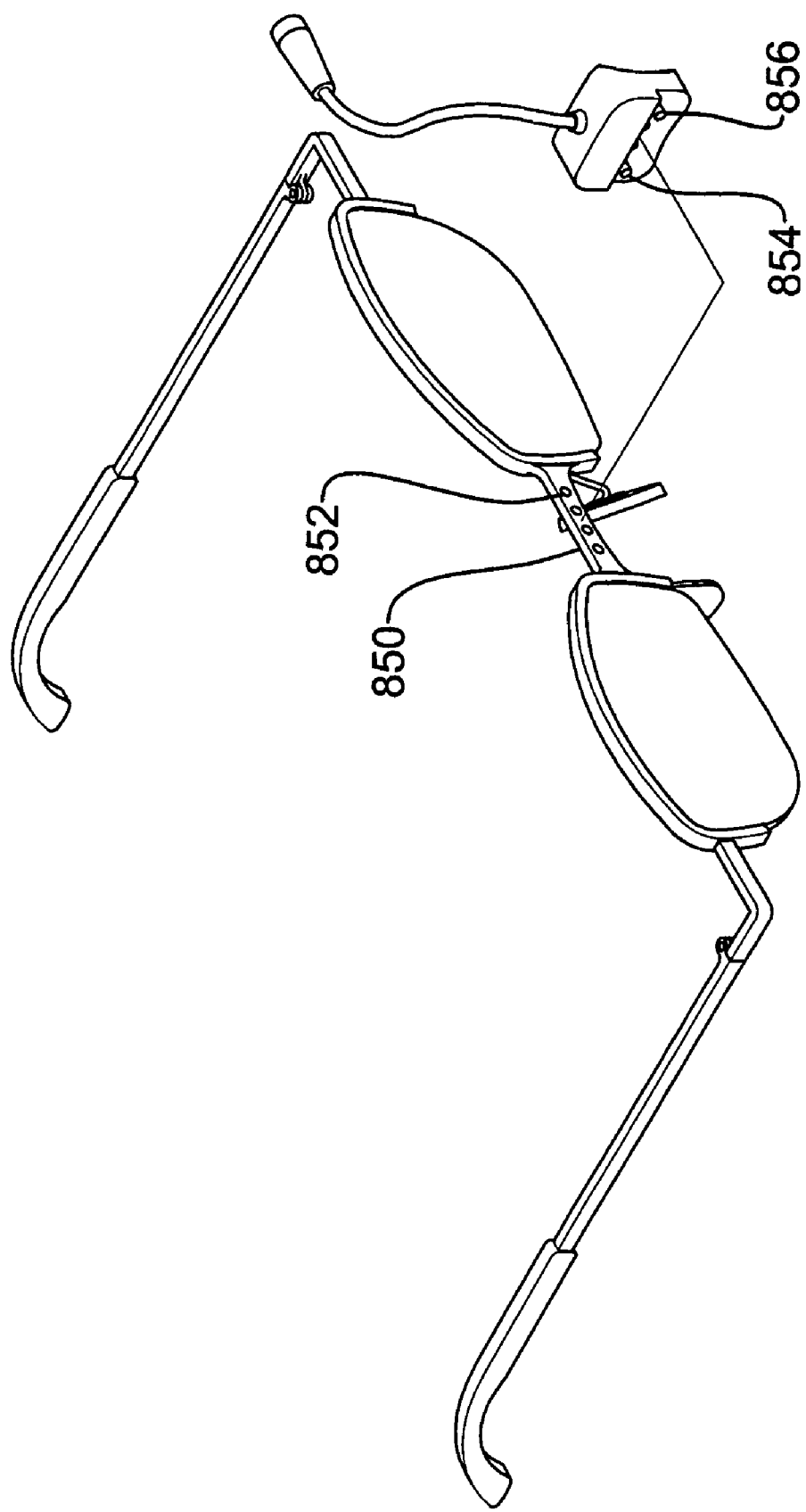

MAGNETICALLY ATTACHABLE LIGHT ASSEMBLY FOR GLASSES

BACKGROUND OF THE INVENTION

1. Field of the Invention

The present invention relates to a light assembly for a pair of glasses, and more particularly to a magnetically attachable light assembly for a pair of glasses.

2. Description of Related Art

To attract customers, numerous enticing features have been incorporated into glasses in the market. One such feature is to integrate a light assembly into a pair of glasses. Different integrated light-assembly designs have previously been disclosed, such as in U.S. Pat. No. 2,638,532; U.S. Pat. No. 5,946,071; Japan patent publication number 9-17204; and People's Republic of China patent CN88203065. The light assemblies described are incorporated into the glasses to provide light. However, in numerous situations, we do not need any extra light. Integrating light assemblies into glasses sometimes can become a burden.

Sometimes, the light assemblies integrated into glasses create unnecessary discomfort. Many consumers prefer light-weight glasses. Since the light assemblies are integrated into the glasses, they tend to make the glasses heavier—whether or not you need the assemblies. Also, the frames for the glasses have to be significantly redesigned to incorporate the light assemblies with their internal power sources.

One approach to ameliorate the discomfort has been described in Taiwan patent No. 484711. In that approach, light assemblies are magnetically attached to the sides or the arms of the glasses. Although the light assemblies can be detached from the glasses, the described approach has a number of challenges. For example, due to the configuration created by the approach, the head of the person wearing the glasses would block some of the emitted light. This will create shadows, and waste power. Also to magnetically attach the light assemblies, each arm needs a magnet That patent publication teaches that the surfaces of the arms should be flat, which, in turn, causes the surfaces of the magnets being flush with the surfaces of the arms. As a result, the light sources are held onto the frame only by magnets. If the magnetic power degrades, light from the light assemblies will point away from the line of sight. This can be quite annoying.

It should be apparent from the foregoing that there is still a need for better light assemblies for glasses.

SUMMARY OF THE INVENTION

The present invention provides a light assembly that can be magnetically attached to a pair of glasses. Based on our invention, when the assembly is attached to the glasses, the person wearing the glasses would not block the light emitted from the light assembly.

In one embodiment, the assembly has a light source and a housing. The housing has a first magnetic element and a power source, which provides energy to the light source. When the light assembly is attached to a pair of glasses, the first magnetic element is magnetically coupled to a second magnetic element. Also, at least a portion of the housing extends over at least a portion of the glasses to provide support for the light assembly.

In one embodiment, the light assembly includes a securing mechanism that incorporates the second magnetic element. The securing mechanism is secured to the frame of the glasses for attaching the light assembly to the pair of glasses. The securing mechanism can include a clamp that holds onto at least a portion of the glasses.

In another embodiment, there is a securing mechanism that incorporates the second magnetic element. The securing mechanism is separate from, but can be magnetically attachable to the light assembly. The securing mechanism is also secured to the frame of the glasses for attaching the light assembly to the pair of glasses.

In yet another embodiment, the second magnetic element is in the glasses.

Other aspects and advantages of the present invention will become apparent from the following detailed description, which, when taken in conjunction with the accompanying drawings, illustrates by way of example the principles of the invention.

BRIEF DESCRIPTION OF THE DRAWINGS

FIG. 8 is a cross-sectional view at an end-piece of a pair of glasses for an embodiment of a light assembly according to the present invention.

FIGS. 27–29 show cross-sectional views of different embodiments of light assemblies with pivotal plates having magnetic elements coupling to a pair of glasses according to the present.

FIG. 30 shows a cross-sectional view of an embodiment of a light assembly with an inverted U-shape recess that has magnetic elements attached to a pair of glasses in accordance with the present invention.

FIG. 31 shows an embodiment of a light assembly that has stubs to further secure to a pair of glasses in accordance with the present invention.

Same numerals in FIGS. 1–34 are assigned to similar elements in all the figures. Embodiments of the invention are discussed below with reference to FIGS. 1–34. However, those skilled in the art will readily appreciate that the detailed description given herein with respect to these figures is for explanatory purposes as the invention extends beyond these limited embodiments.

DETAILED DESCRIPTION OF THE PREFERRED EMBODIMENT

Figure 1:
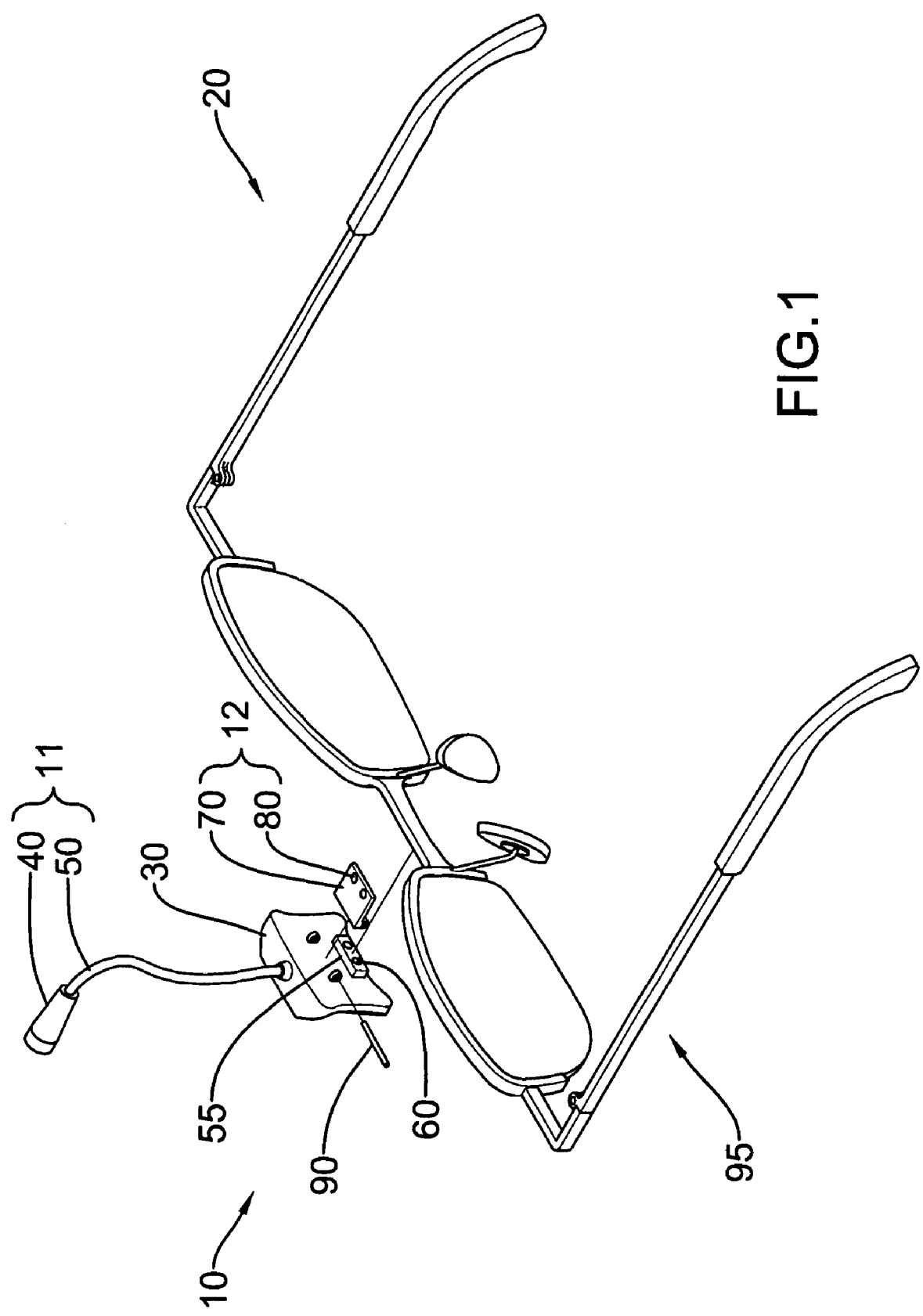
FIG. 1 shows one embodiment of a light assembly with a securing mechanism that has a clamp for attaching to a pair of glasses in accordance with the present invention.

FIG. 1 shows one embodiment of a light assembly 10 of the present invention. The light assembly 10 can be magnetically attached to a pair of glasses 20 through a securing mechanism 12. The light assembly 10 includes a light source 11, and a housing 30.

The light source 11 includes a light bulb assembly 40 and a flexible neck 50. The flexible neck connects the light bulb assembly to the housing both electrically and mechanically. The neck can be a malleable tube, such as a plastic tube. The flexibility of the neck allows the light bulb assembly 40 to be moved or rotated to different orientations relative to the housing 30.

The housing 30 includes a power source to provide energy to the light source. The power source can include one or more batteries, which can be rechargeable.

The housing 30 has a rear surface, which faces the pair of glasses when the assembly 10 is attached to the glasses. The housing also has two ears, which are formed on and protrude from the rear surface. Each ear has a hole.

The securing mechanism 12 includes a clamp 70 at the rear surface of the housing 30. The clamp can be an L-shape clamp, composed of a short portion (the short part of the L) and a long portion (the long part of the L). There can be two holes at the short portion. These two holes can be aligned to the holes at the ears on the rear surface of the housing to allow a pin 90 to thread through them. This will allow the clamp to pivot about the pin.

There can be a seat 55, protruding from the rear surface of the housing 30. One or more first magnetic element 60 is embedded in the seat 55. Each element can be a magnet, or can be an element made of a substance that is magnetically attracted by a magnet.

The long portion of the clamp also has one or more second magnetic element 80. Either the first or the second or both the first and second magnetic elements are magnets to allow the first magnetic element to be magnetically coupled to the second magnetic element.

The first magnetic element 60 in the seat is located in an area corresponding to the second magnetic element 80 such that when the clamp pivots down, the first magnetic element is in a position to magnetically couple to the second magnetic element.

With the seat protruding from the rear surface of the housing, when the first magnetic element is coupled to the second magnetic element, a passage is formed between the L-shaped clamp 70, the rear surface of the housing 30, and the seat of the housing.

Figure 2:
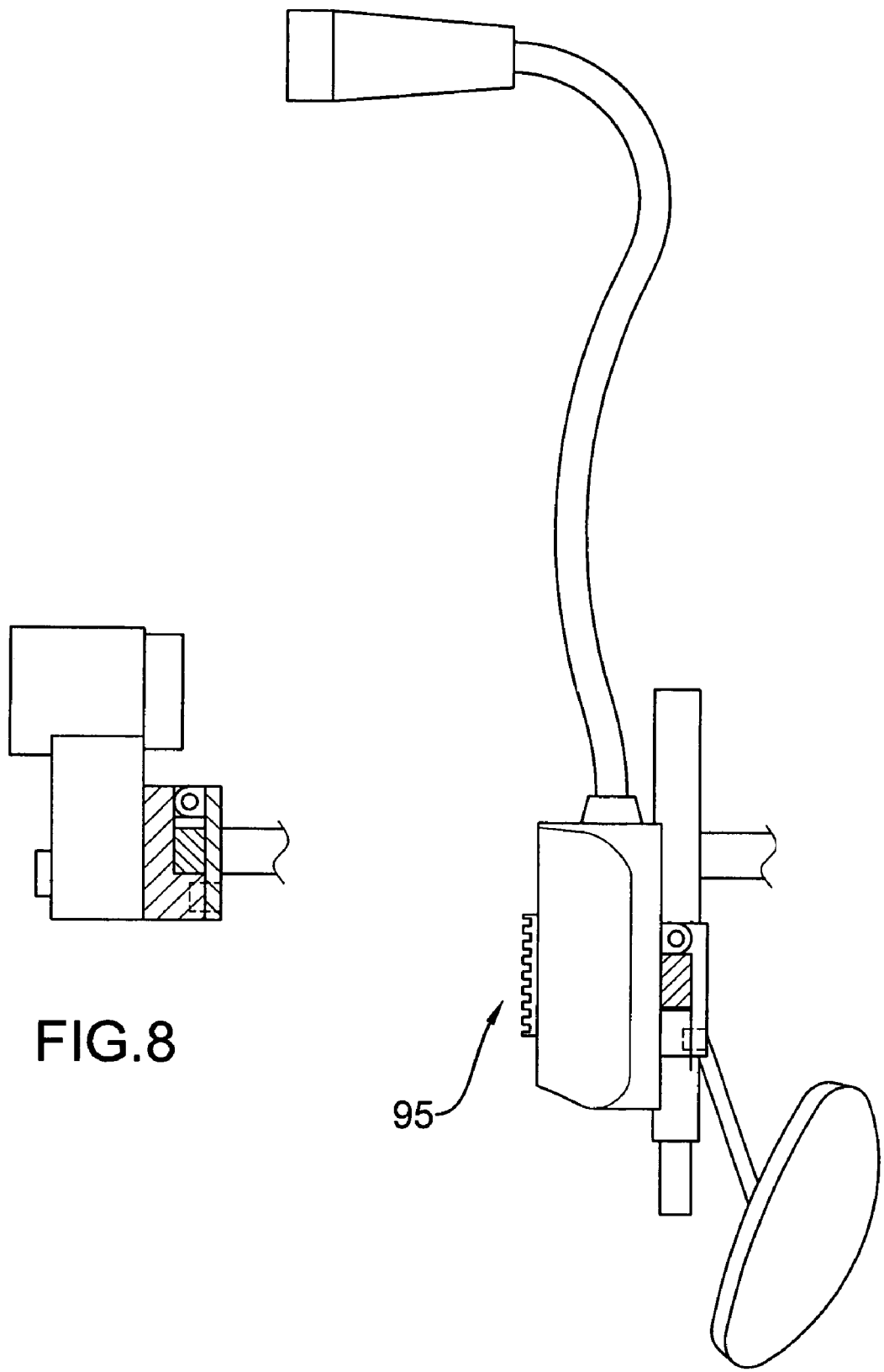
FIG. 2 shows a cross-sectional view at the bridge of the glasses for an embodiment of a light assembly that has a clamp according to the present invention.

FIG. 2 shows a cross-sectional view at the bridge of the glasses with the light assembly attached. The attachment is by positioning the bridge through the passage formed by the clamp 70, the rear surface of the housing 30, and the seat 55. The L-shaped clamp 70 pivots down until the second magnetic element 80 on the long portion of the clamp abuts the front face of the seat. Magnetic attraction between the first and the second magnetic elements holds the L-shaped clamp 70 to the seat, which in turn stably attaches the light assembly 10 to the glasses 20.

In one embodiment, on the inner surface of the clamp or on other surface(s) of the passage, there is a spongy or rubbery material to increase frictional force between the bridge and the clamp. This frictional force can help prevent the light assembly 10 from rotating relative to the bridge. The spongy or rubbery material can have a saw-tooth surface to further increase its frictional force.

FIG. 2 also shows a control switch 95 on the housing 30. The switch allows the light source 11 to be turned on and off.

Figure 3:
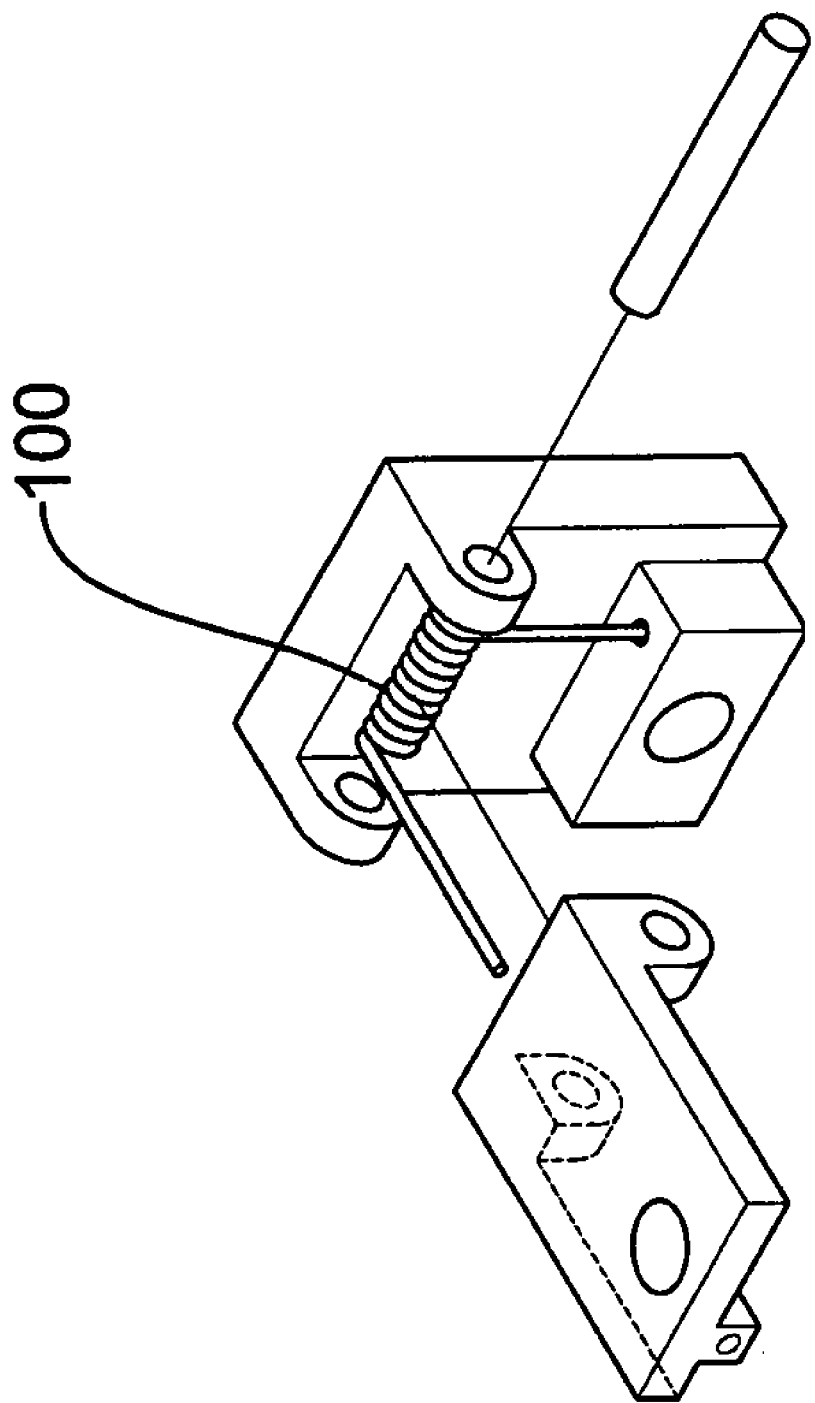
FIG. 3 shows an embodiment of a resilient element incorporated into the clamp of a light assembly according to the present invention.

FIG. 3 shows an embodiment of a resilient element incorporated into the clamp of a light assembly. A segment of the short portion at the pivot end of the L-shaped clamp can be removed to accommodate a resilient element such as a spring 100 around the pivot pin 90. FIG. 3 shows the spring in its stretched mode. When the clamp 70 abuts to the seat, the spring is in its natural, un-stretched. With the resilient element, the light assembly can be more securely attached to the pair of glasses.

Figure 4:
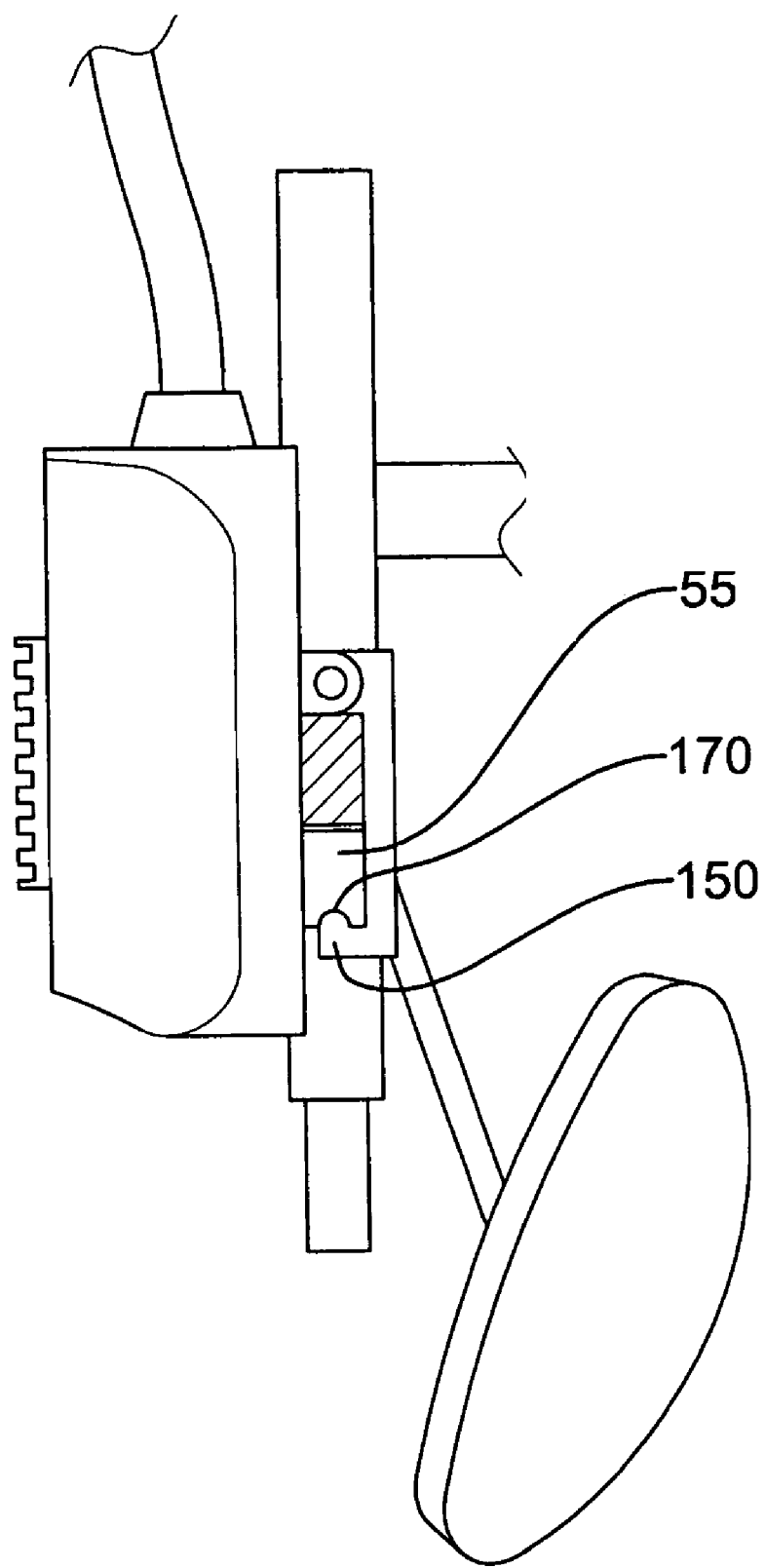
FIG. 4 is a cross-sectional view at the bridge of a pair of glasses for an embodiment of a light assembly that has a hook in the clamp according to the present invention.

FIG. 4 shows a cross-sectional view of another embodiment of a light assembly where the L-shaped clamp 70 has a round-head hook 150, and the seat 55 has a detent 170. When the L-shaped clamp is closed against the seat 55, the hook 150 is pressed into the detent 170 to hold the clamp in place.

Figure 5:
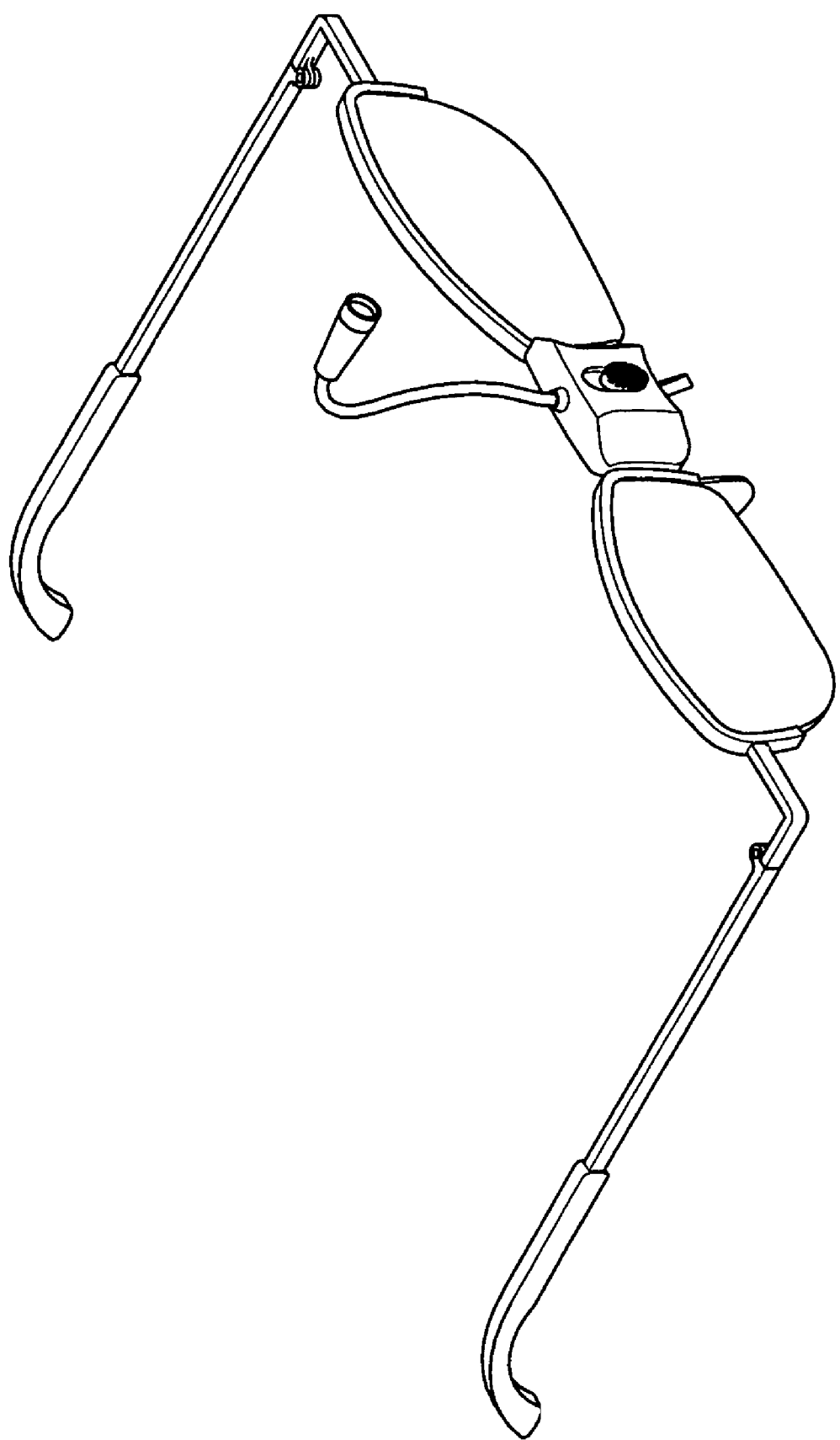
FIG. 5 is an operational view of an embodiment of a light assembly attached to a pair of glasses according to the present invention.

FIG. 5 shows an operational view of the light assembly 10 attached to the bridge of the pair of glasses 20. When attached, at least a portion of the housing 30 extends over at least a portion of the glasses to provide support for the light assembly. Based on the location and the attachment mechanism of the light assembly, the head of the person wearing the glasses would not block the light emitted from the light assembly.

Figure 6:
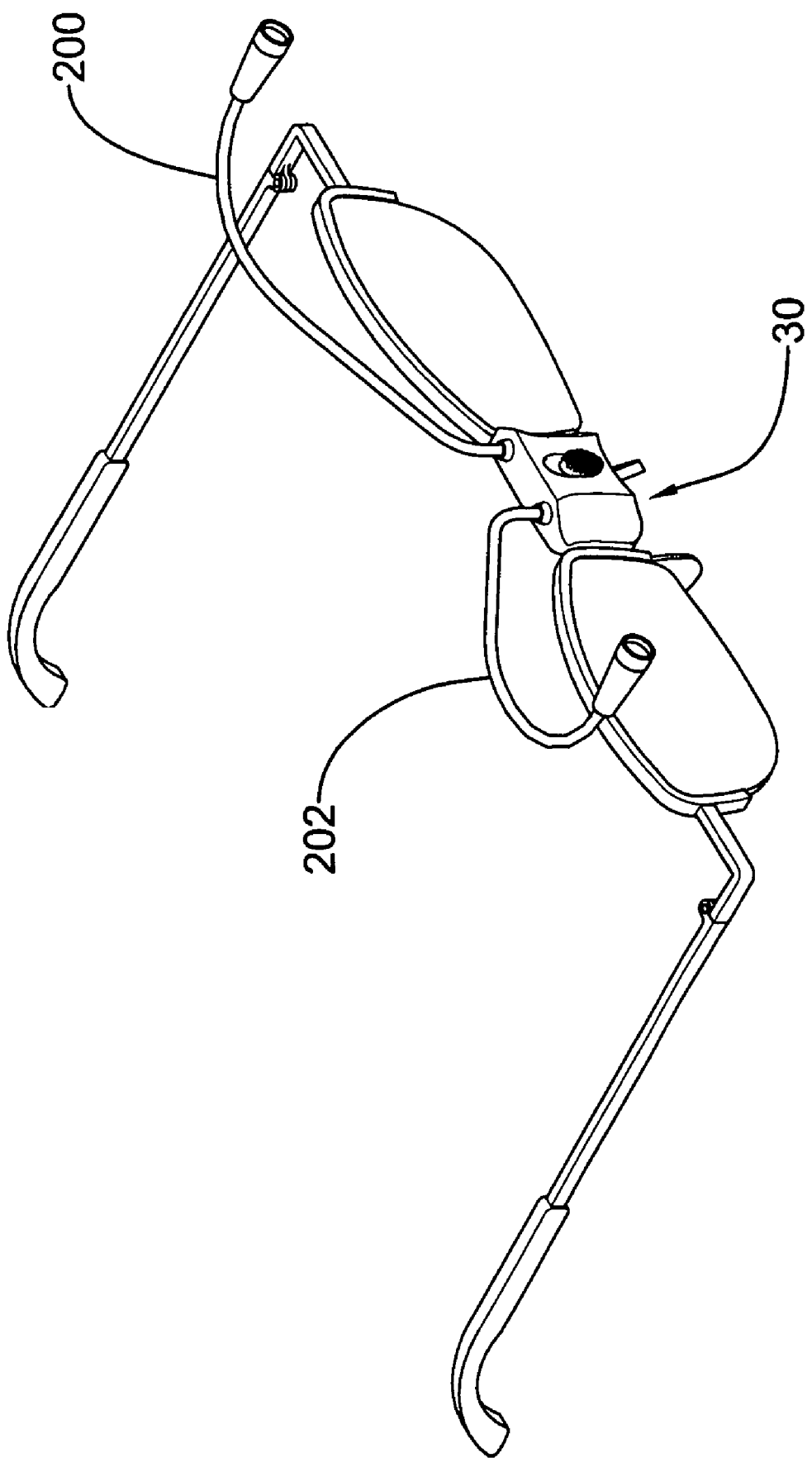
FIG. 6 is an operational view of an embodiment of a light assembly with two light sources, attached to a pair of glasses according to the present invention.

FIG. 6 shows another embodiment of the invention with more than one light sources 200, 202, connected to the housing 30. This embodiment can provide a larger footprint for the light pattern.

Figure 7:
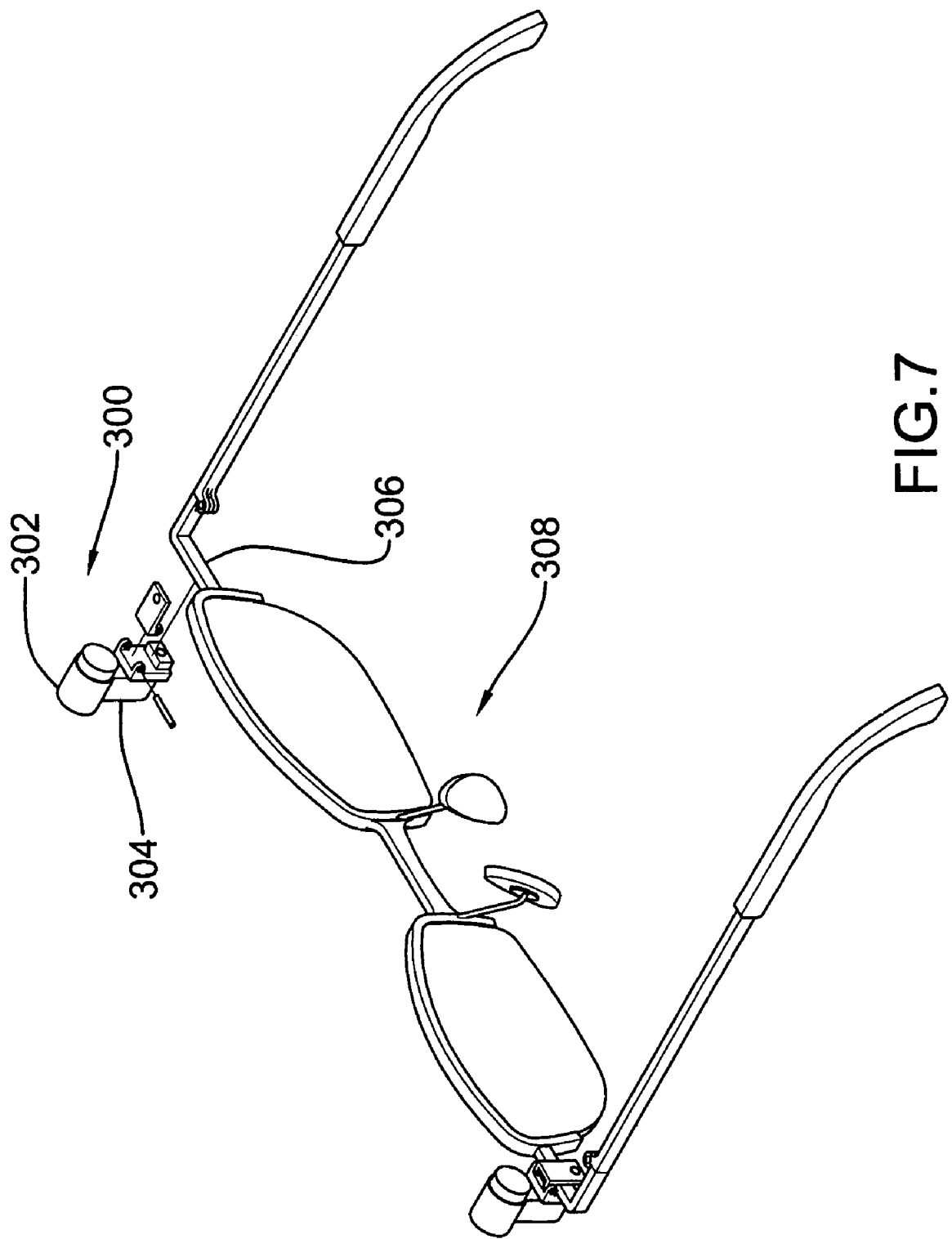
FIG. 7 shows an embodiment according to the present invention with two sets of light assemblies for mounting to the end-pieces of a pair of glasses.
Figure 9:
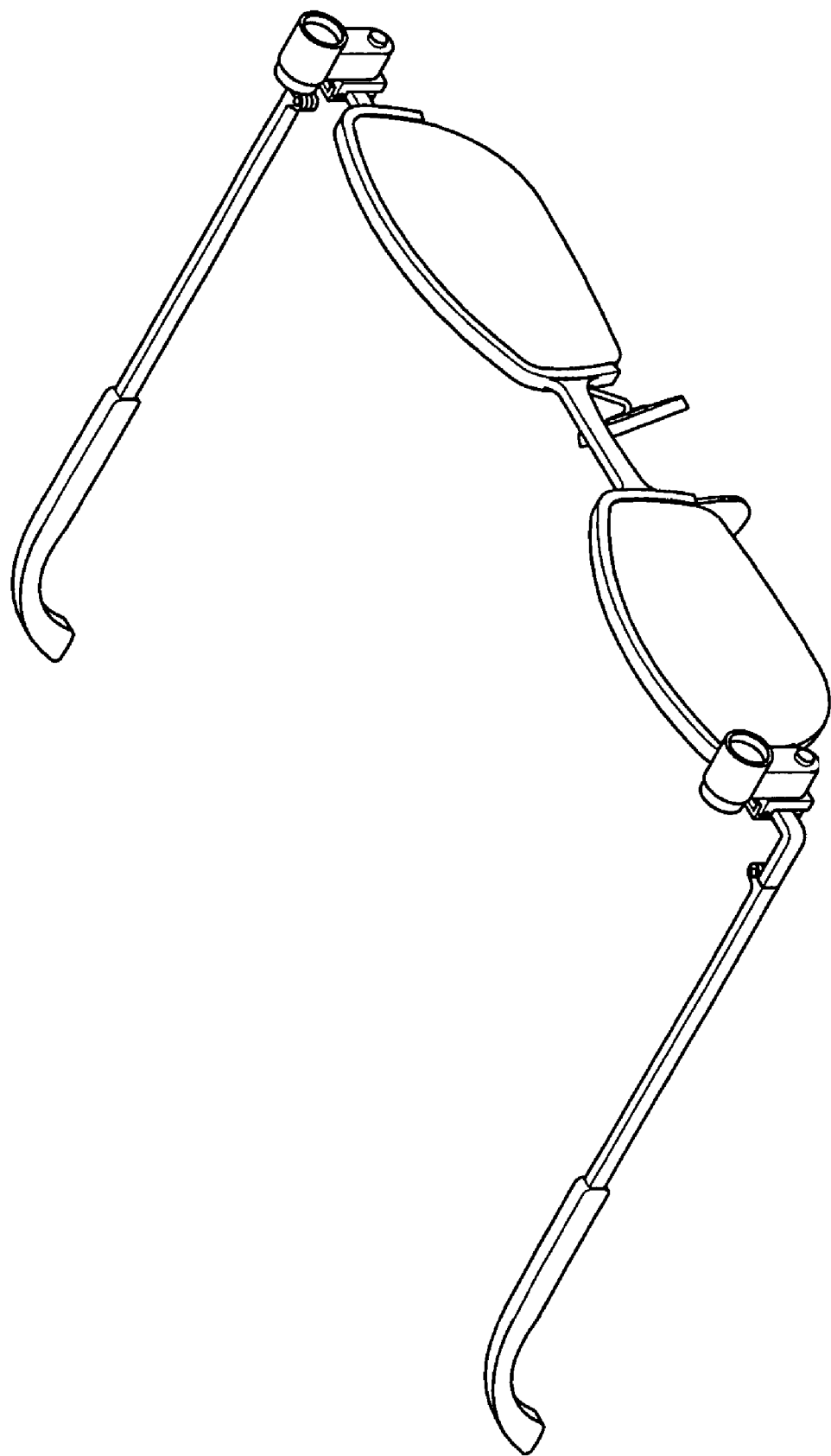
FIG. 9 is an operational view of an embodiment with two light assemblies attached to the end-pieces of a pair of glasses according to the present invention.

FIGS. 7, 8 and 9 show yet another embodiment of a light assembly 300 in accordance with the present invention. The light assembly 300 can be more compact in size than the embodiment shown in FIG. 1. The battery in the assembly 300 can be a micro-sized battery. In this embodiment, the light bulb assembly 302 is mounted on the housing 304, without an intervening flexible neck. The light source can have a bottom that is attached to the housing. In FIG. 7, one light assembly 300 is in position to be attached to one end-piece 306 of the glasses 308.

Figure 10:
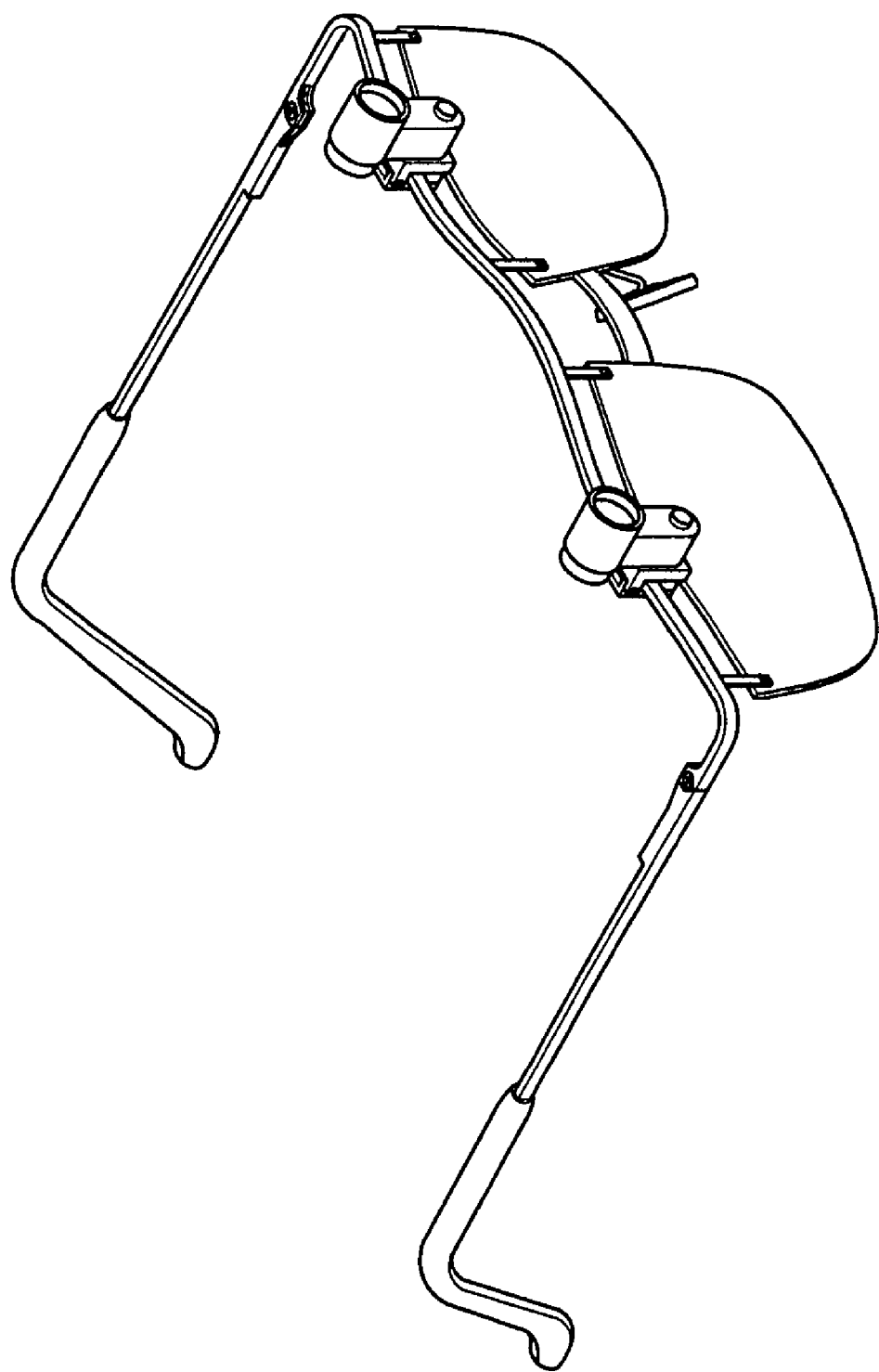
FIG. 10 is an operational view of an embodiment with two light assemblies attached to a cross-frame of a pair of glasses according to the present invention.
Figure 11:
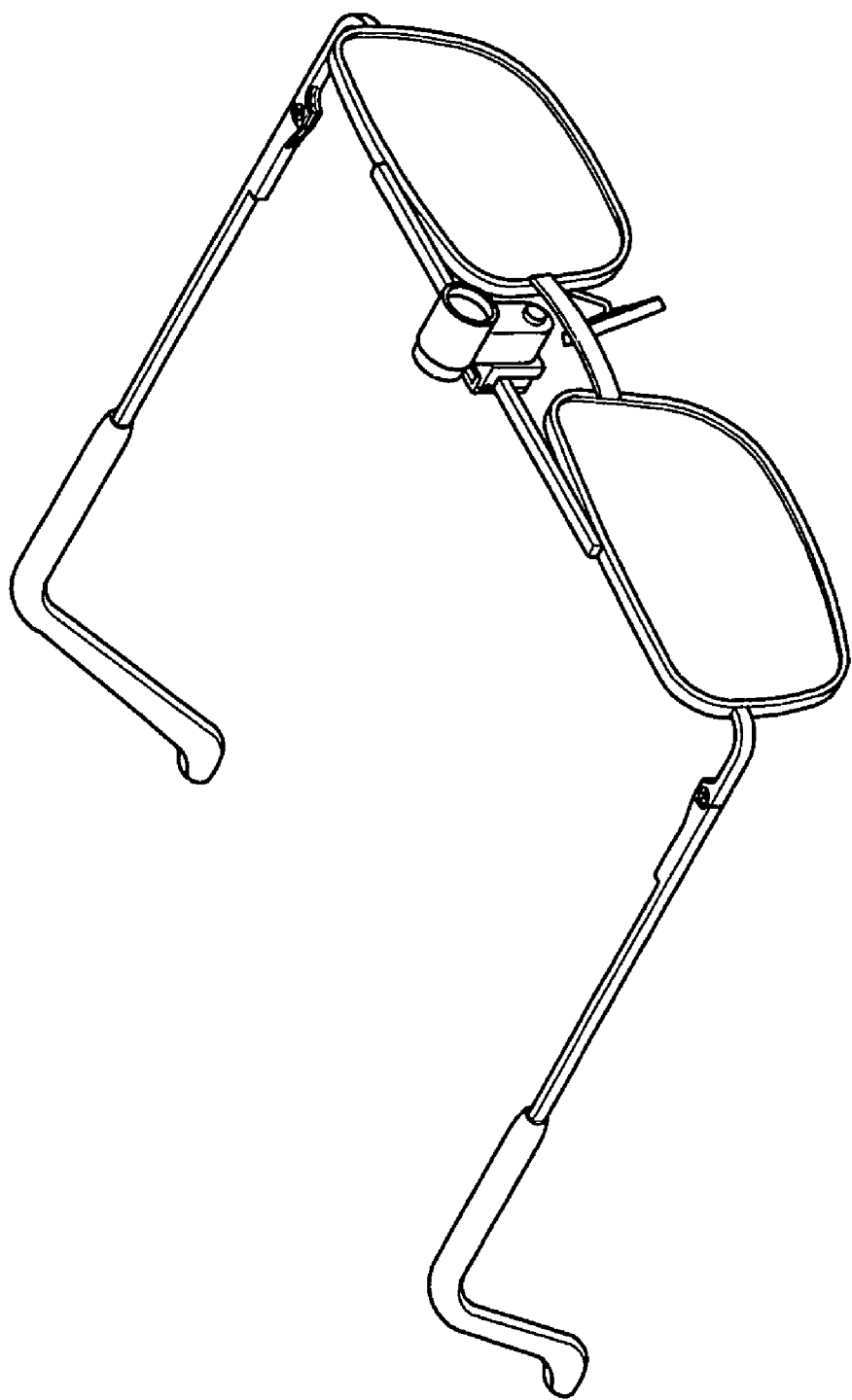
FIG. 11 is an operational view of an embodiment of a light assembly attached to another cross-frame of a pair of glasses according to the present invention.

Different embodiments of invented light assemblies can be attached to a mounting frame of a pair of glasses. FIGS. 10 and 11 illustrate examples of such configurations. In FIG. 10, the mounting frame is on top of a pair of glasses. In FIG. 11, the mounting frame is between the two lenses of a pair of glasses.

Figure 12A:
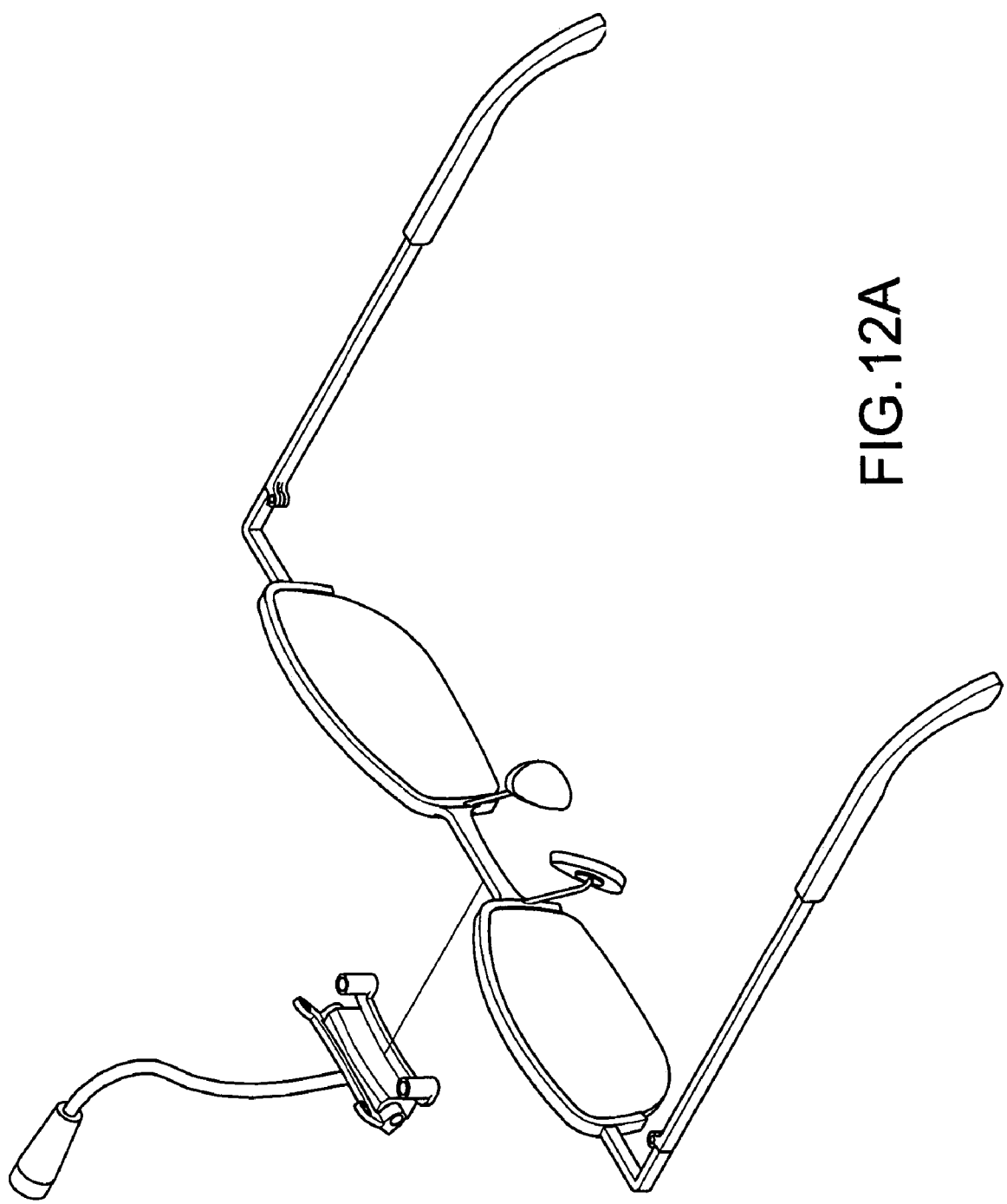
FIGS. 12A–B show an embodiment of a light assembly with a securing mechanism that has a clamp for attaching to a pair of glasses in accordance with the present invention.
Figure 12B:
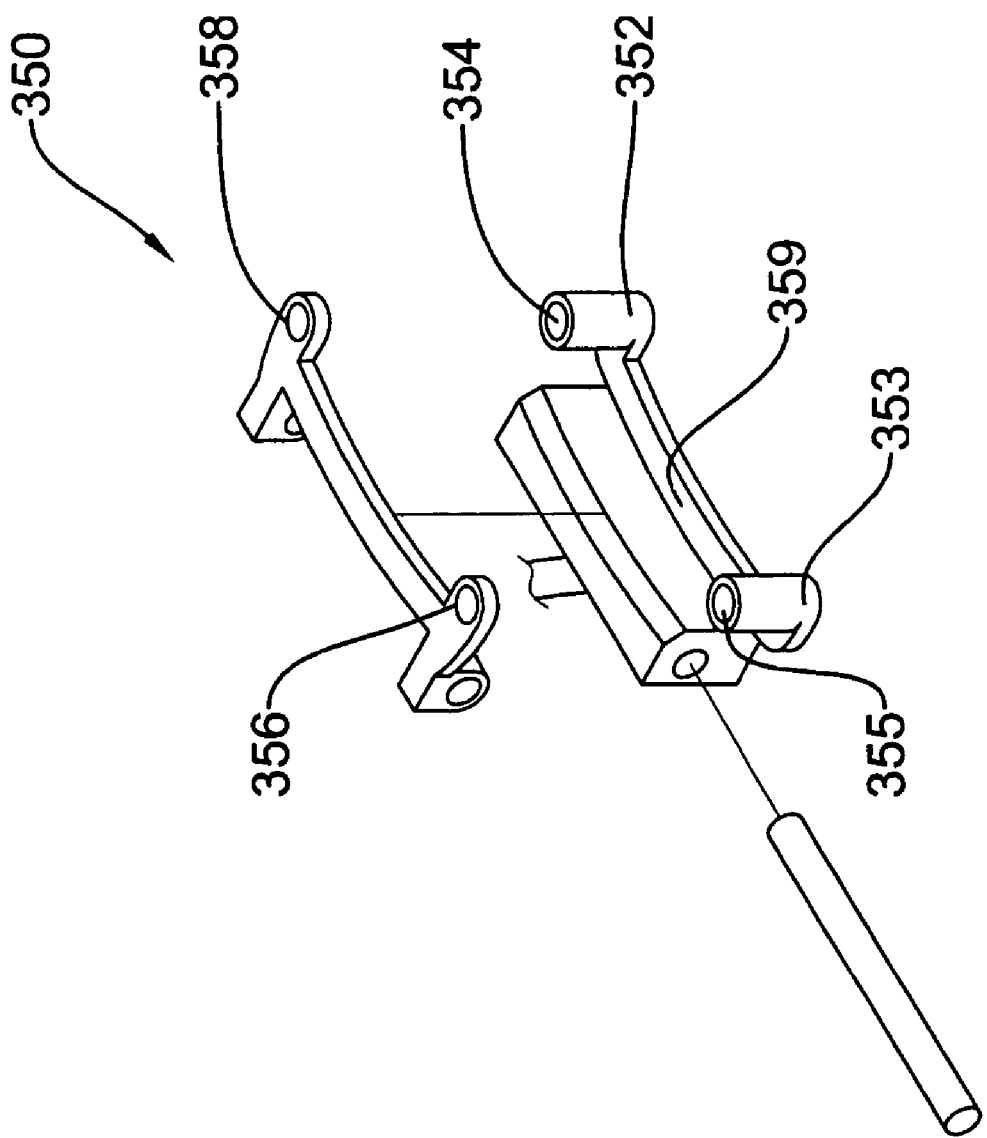

FIGS. 12A–B show another embodiment of a light assembly with a securing mechanism that has a clamp. This embodiment has a miniaturized housing 350 that attaches to a light source. The miniaturized housing includes two first magnetic elements 356, 358 and a pivot joint for clamping. The miniaturized housing also has a seat 359 with two stubs 352, 353 formed at two opposite ends of the seat. Two second magnetic elements 354, 355 are embedded, one in each stub 352, 353, to couple to the first magnetic elements 356, 358 on the housing 350. Additionally, a resilient mechanism, such as the one shown in FIG. 3, can be used to further secure the clamping configuration.

Figure 13:
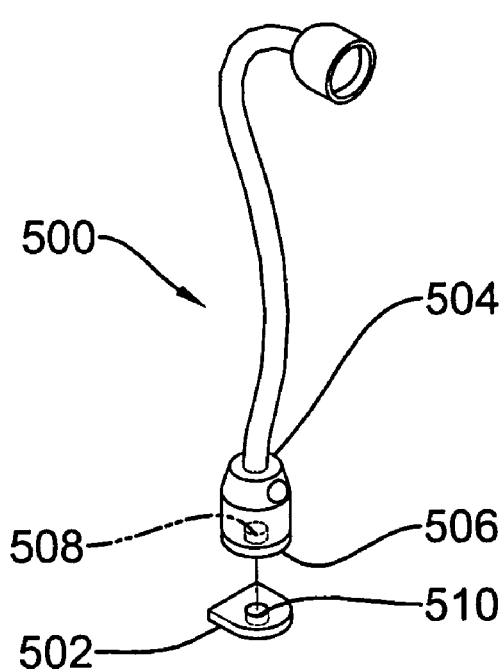
FIG. 13 shows an embodiment of a light assembly with a securing mechanism that is separate from the light assembly according to the present invention.
Figure 14:
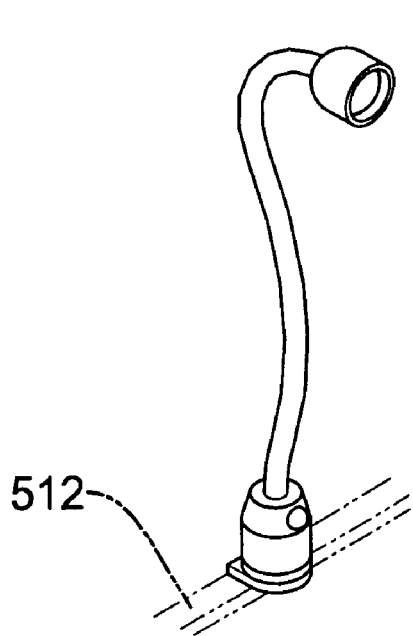
FIG. 14 shows the embodiment in FIG. 13 attached to an area of a pair of glasses.

A number of embodiments have been described where the light assembly includes a securing mechanism. FIGS. 13 and 14 illustrate another embodiment of the invention where the securing mechanism 502 is separate from and can be magnetically attached to the light assembly 500. The light assembly 500 includes a housing 504, which has a first magnetic element 508 at its bottom 506. The securing mechanism 502 has a second magnetic element 510 to allow the housing to be magnetically attached to the securing mechanism 502.

In the embodiment shown in FIGS. 13 and 14, the securing mechanism 502 can be securely connected to an area of a pair of the glasses 512 by glue or adhesive, or through a soldering process. As a result, the securing mechanism 502 is secured to the frame of the glasses for attaching the light assembly 500 to the pair of glasses. If desired, the light assembly can be magnetically detached from the glasses, leaving only the securing mechanism connected.

Figure 15:
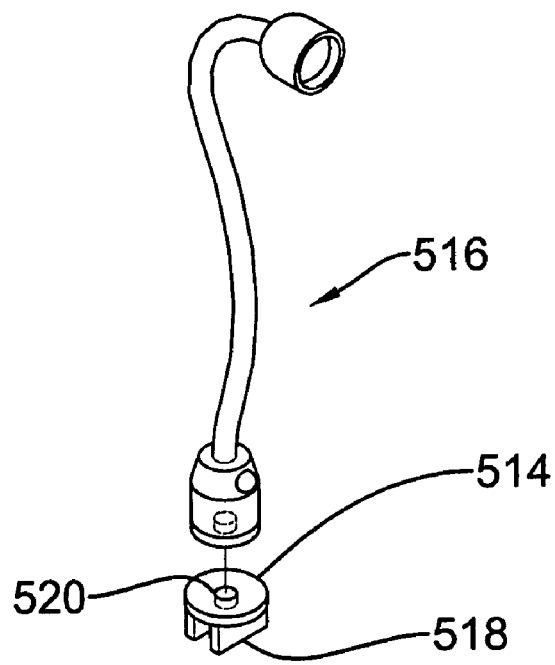
FIG. 15 shows another embodiment of a light assembly with a securing mechanism that is separate from the light assembly according to the present invention.
Figure 16:
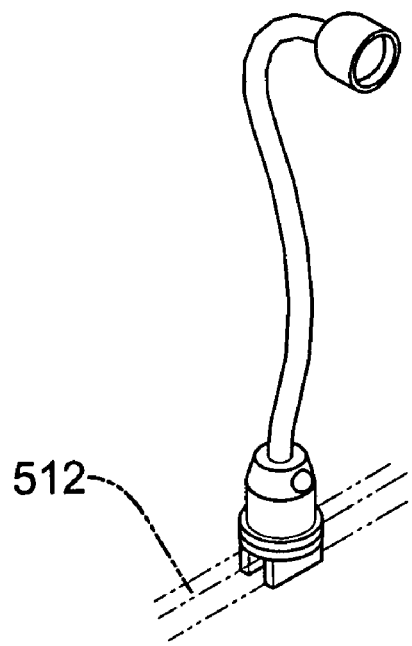
FIG. 16 shows the embodiment in FIG. 15 attached to an area of a pair of glasses.

FIGS. 15 and 16 illustrate another embodiment of a securing mechanism 514 that is separate from a light assembly 516. In this embodiment, the securing mechanism 514 has a base with a bottom that has an engaging element 518. A second magnetic element 520 is embedded in the base. In this example, the engaging element 518 includes two parallel tabs extending downward from the bottom of the base. The tabs can squeeze onto an area of a pair of glasses 512 to securely attach the securing mechanism 514 to the glasses 512. The securing mechanism 514, secured to the frame of the glasses, can magnetically attach to the light assembly 516. Note that engaging elements other than tabs can be used to secure the securing mechanism onto a pair of glasses.

Figure 17:
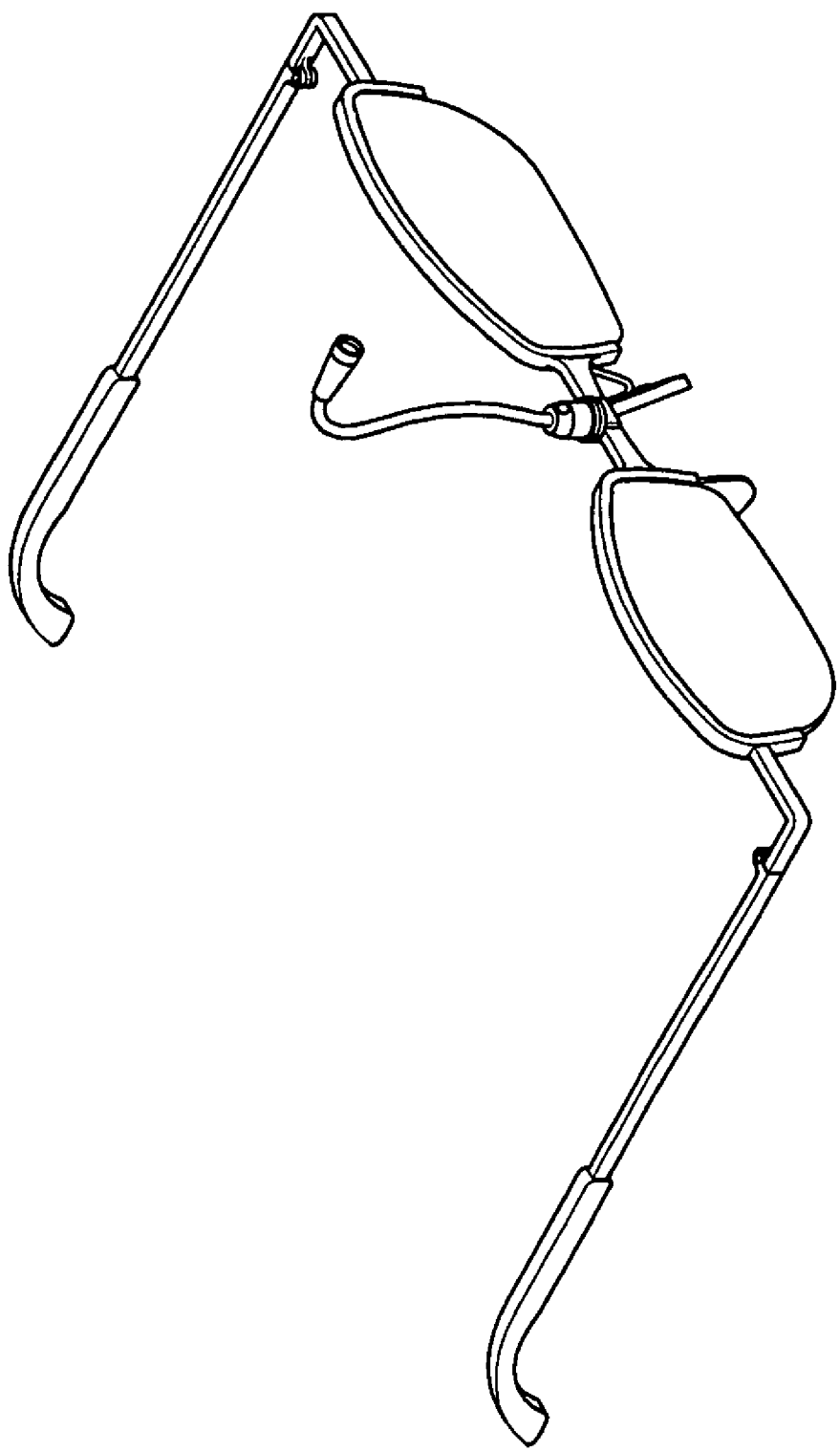
FIG. 17 shows an operational view of an embodiment of a light assembly with a separate securing mechanism, attached to the bridge of a pair of glasses in accordance with the present invention.
Figure 18:
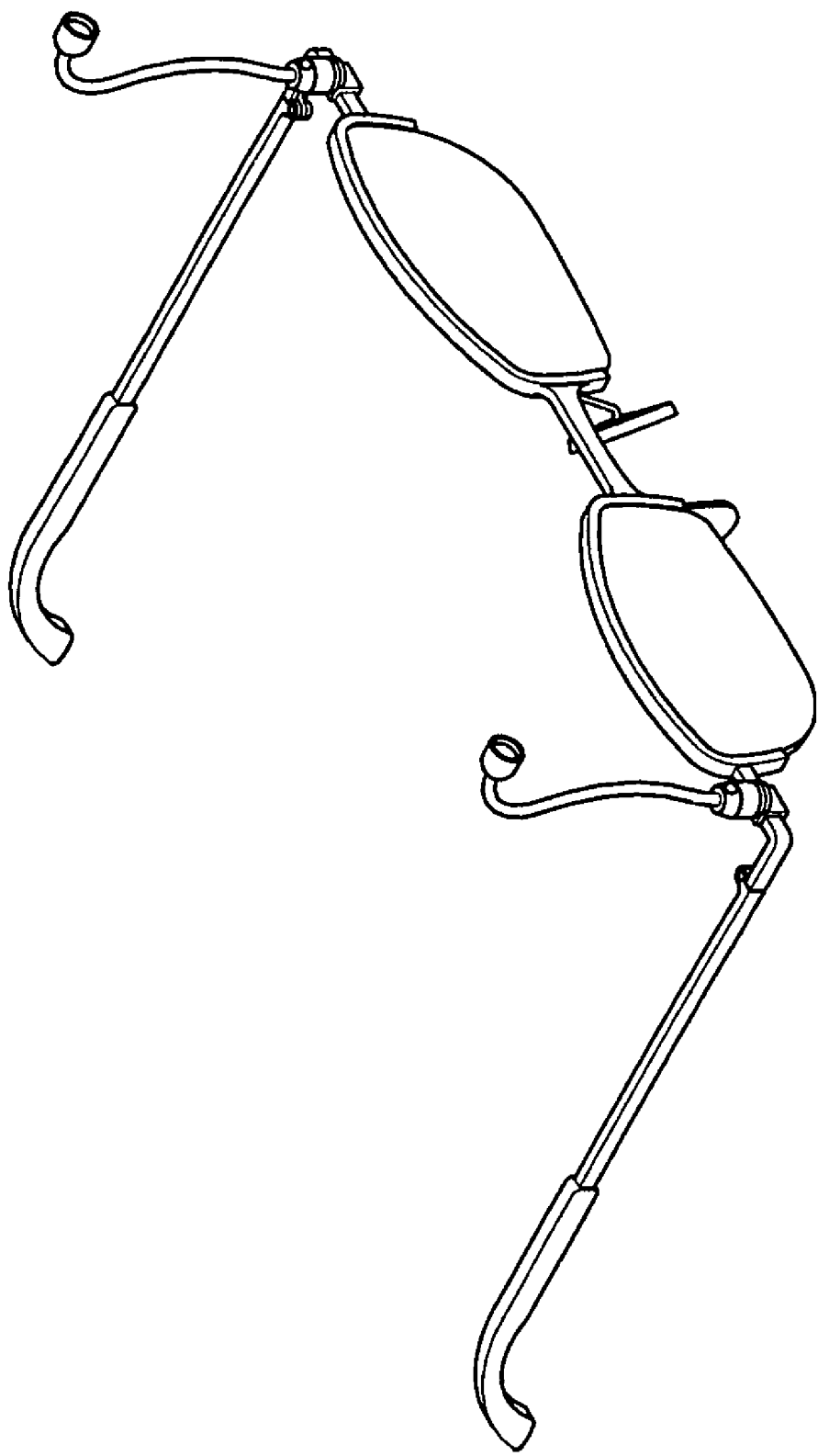
FIG. 18 shows an operational view of an embodiment of two light assemblies with separate securing mechanisms, attached respectively to two end-pieces of a pair of glasses according to the present invention.

FIGS. 17 and 18 illustrate light assemblies with separate securing mechanisms attached to glasses through engaging elements. In FIG. 17, the light assembly is at the bridge; and in FIG. 18, light assemblies are at the end-pieces of a pair of glasses. Note that the light assemblies can also be attached to other areas of the glasses.

Figure 19:
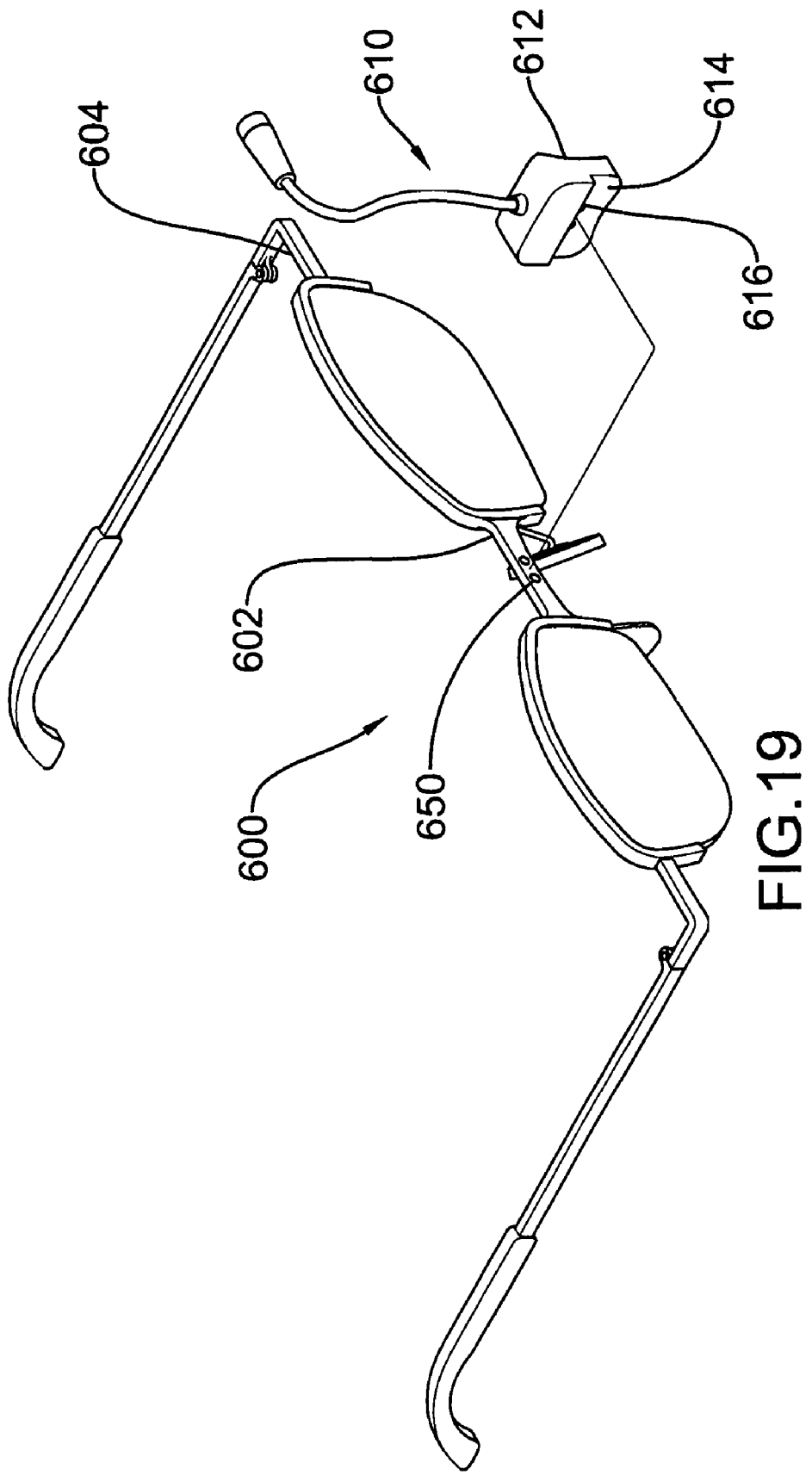
FIG. 19 shows an embodiment of a light assembly according to the present invention for a pair of glasses with magnetic elements.
Figures 20, 22:
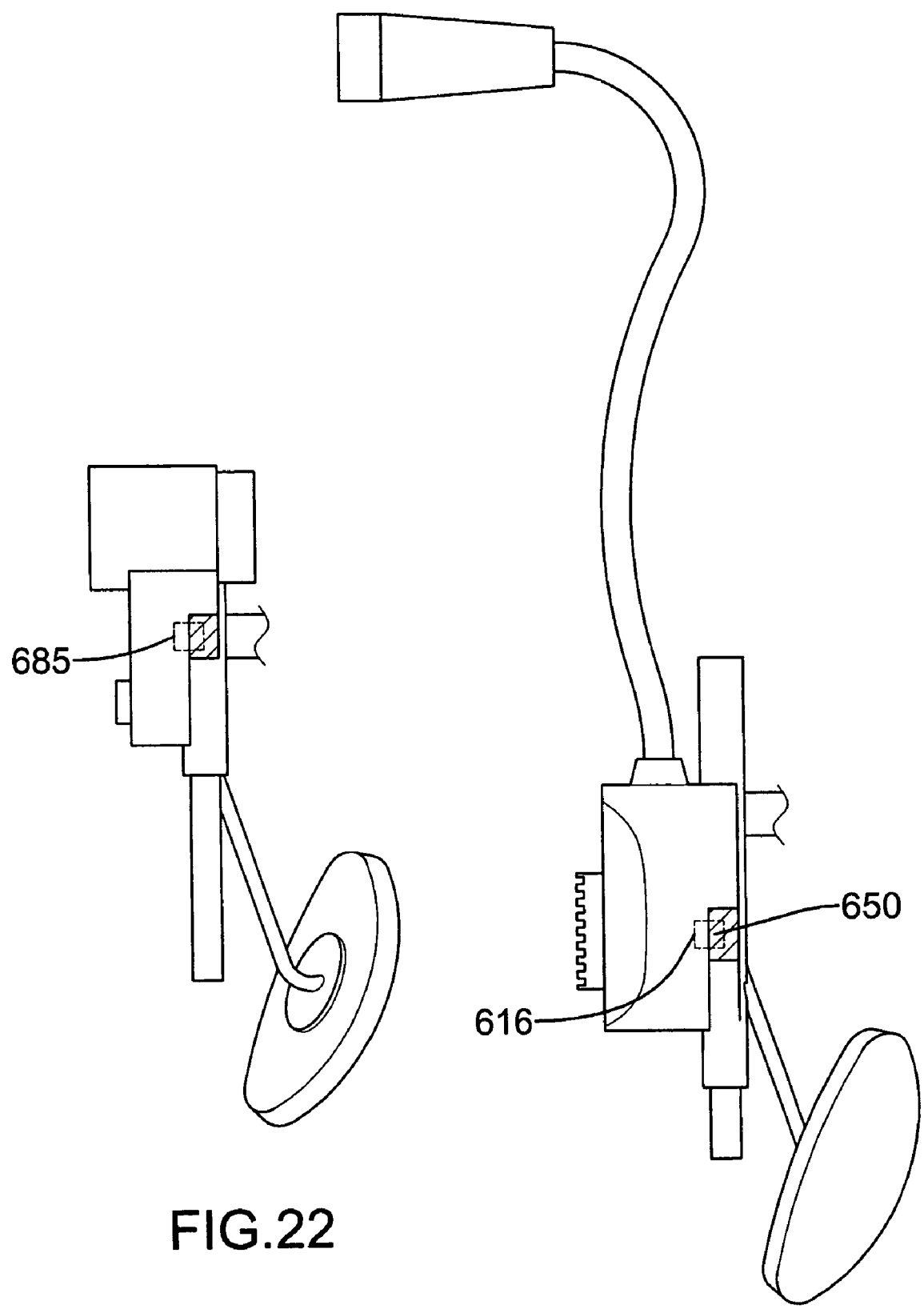
FIG. 20 shows a cross-sectional view of an embodiment of a light assembly attached to the bridge of a pair of glasses with magnetic elements according to the present invention.
FIG. 22 shows a cross-sectional view of an embodiment of a light assembly attached to the bridge of a pair of glasses with magnetic elements according to the present invention.

A number of embodiments have been described with a securing mechanism that incorporates a second magnetic element. In yet another embodiment, as shown in FIG. 19, a second magnetic element 650 is in a pair of glasses 600. FIG. 20 shows a cross-sectional view at the bridge with the light assembly 610 attached to the bridge of the glasses 600.

The light assembly 610 has a housing 612, which is adapted to be attached to an area of the pair of glasses 600, such as its bridge 602 or its end-piece 604. The housing 612 includes a first magnetic element 616 and an engaging mechanism on its rear side, which is the side facing the glasses, when the light assembly is attached to the glasses. In a first embodiment, the engaging mechanism is an engaging recess 614 defined in the rear side of the housing 612. The recess has a longitudinal surface and an upper surface connected to the longitudinal surface. One or more first magnetic elements 616 are embedded in the longitudinal surface of the engaging recess.

When the light assembly 610 is attached to the glasses, the bridge of the glasses is received in the engaging recess 614. At least a portion of the upper surface of the recess extends over the bridge to provide further support for the light assembly, if necessary. When attached, the two second magnetic elements 650 embedded in the bridge, are magnetically coupled to the first magnetic elements 616 in the recess 614.

Figure 21:
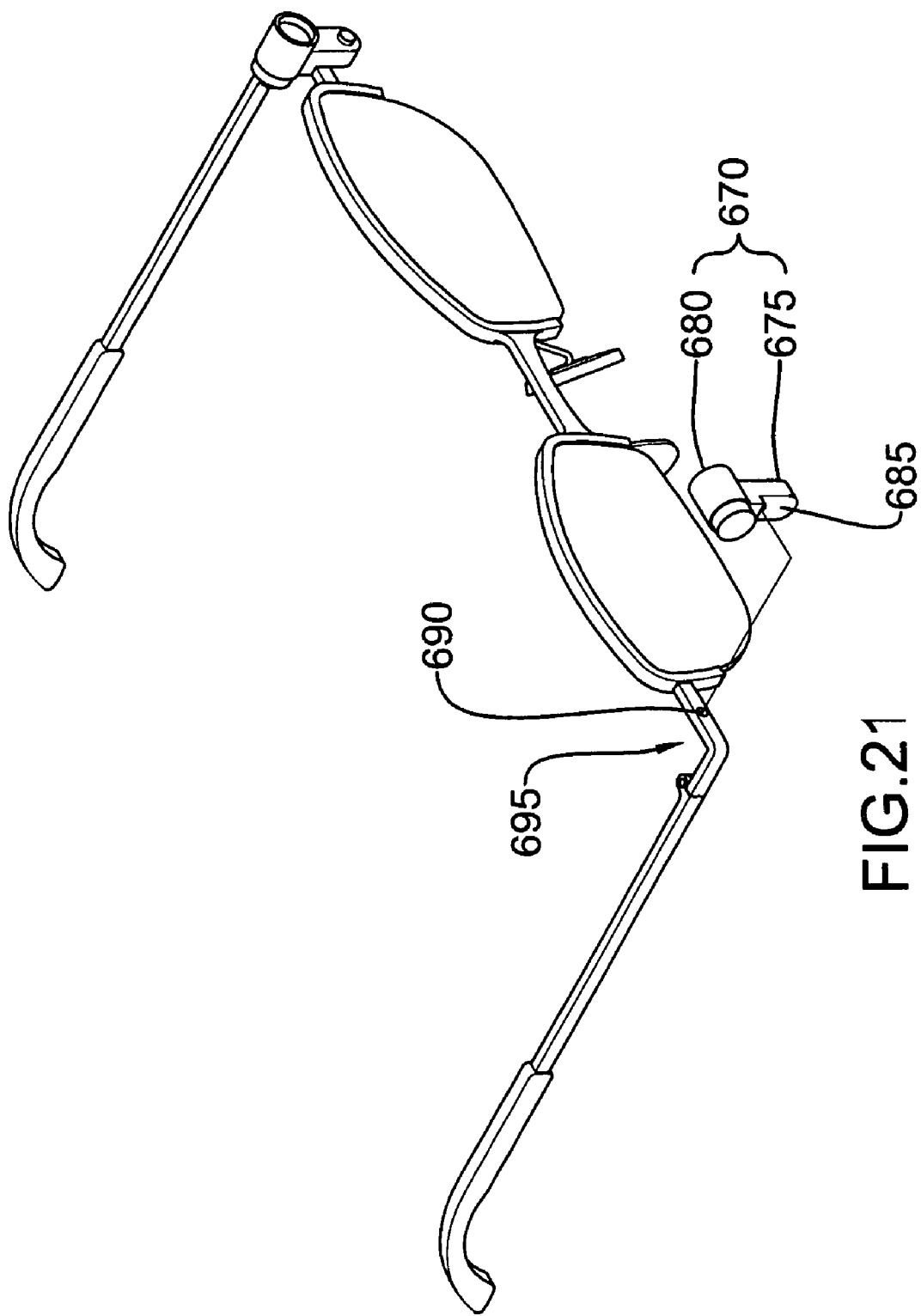
FIG. 21 shows another embodiment of a light assembly according to the present invention for a pair of glasses with magnetic elements.

FIG. 21 shows another embodiment of a light assembly that can be more compact than the one shown in FIG. 19. FIG. 22 shows a cross-sectional view of the light assembly 670 at the bridge of the glasses. In this embodiment of the light assembly 670, its light source includes a light bulb assembly 680, which is pivotally connected to the housing 675 of the light assembly. The pivotal attachment allows the bulb assembly to be rotated relative to the housing. The housing 675 has an engaging mechanism, which is an engaging recess 685 with a first magnetic element. In this embodiment, there is a second magnetic element 690 at an end-piece 695 of the glasses. When the light assembly 670 is attached to an end-piece of the frame of the pair of glasses, the first magnetic element on the housing will be magnetically coupled to the second magnetic element 690 at the end-piece. Also, at least a portion of the engaging recess of the light assembly 670 extends over at least a portion of the end-piece and, if necessary, the light assembly can be supported by the end-piece.

Figures 23, 24, 25, 26:
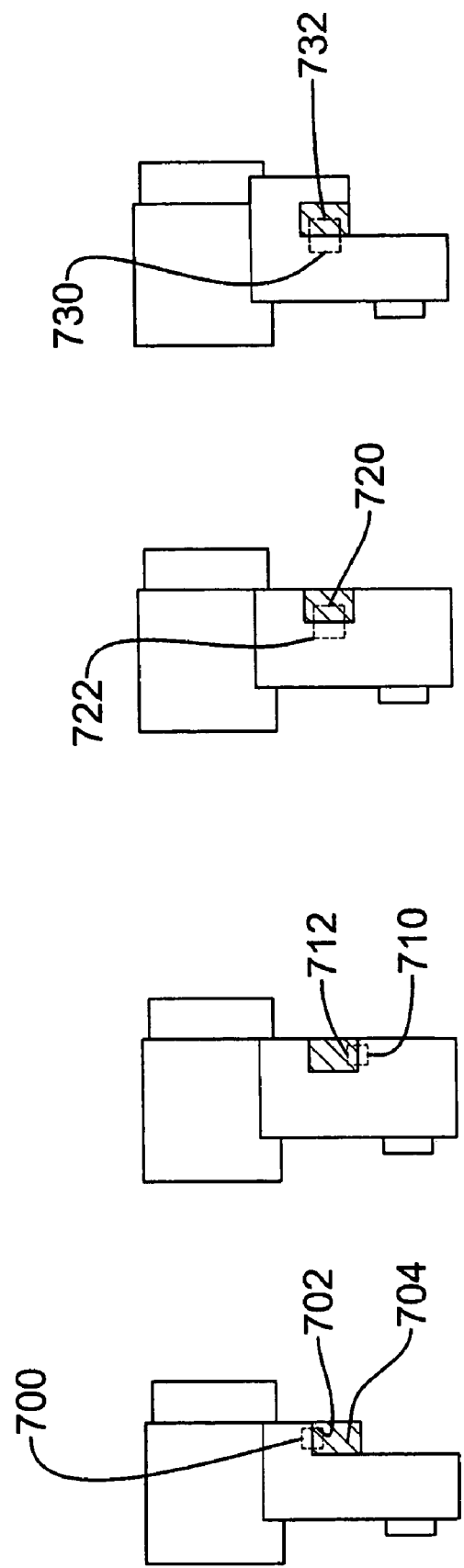
FIG. 23 shows a cross-sectional view of an embodiment of a light assembly magnetically attached in a top-down configuration to a pair of glasses according to the present invention.
FIGS. 24–25 illustrate cross-sectional views of different embodiments of a light assembly with recesses in the shape of a channel magnetically receiving a pair of glasses according to the present invention.
FIG. 26 shows a cross-sectional view of an embodiment of a light assembly with an inverted U-shape recess magnetically receiving a pair of glasses according to the present invention.

In FIGS. 19–22, magnetic coupling occurs in a plane substantially parallel to the face of the lenses of the glasses. However, magnetic coupling can occur in a top-down configuration. As shown in FIG. 23, a first magnetic element 700 is in the upper surface of the recess of the light assembly. The corresponding second magnetic element 702 in the glasses is on the top surface of an area the glasses to ensure a top-down magnetic attachment. In FIG. 23, the shaded region represents the glasses.

Note that the engaging recess does not have to be in the configuration of a step. In the embodiments shown in FIGS. 24 and 25, the engaging recess can be in the shape of a C or a channel to receive the glasses, such as its bridge or end-piece. In FIG. 24, a second magnetic element 712, generally located on a bottom surface of the glasses, is magnetically coupled to a first magnetic element 710 located in a bottom surface of the channel in the light assembly. In FIG. 25, a second magnetic element 720, generally located on a front surface of the glasses, is magnetically coupled to a first magnetic element 722 in a side surface of the channel in the light assembly.

With respect to FIG. 26, the light assembly has an inverted U-shape recess. Again the shaded region is a portion of the glasses, such as its bridge or its end-piece. In this example, when the inverted U-shape recess hooks onto, such as the bridge of the glasses, a first magnetic element 730 in the light assembly is coupled to a second magnetic element 732 on the front surface of the bridge of the glasses.

In yet another embodiment, the light assembly includes a pivotal plate that holds a first magnetic element. FIGS. 27 to 29 shows different versions of such embodiments. For example, in FIG. 27, the engaging recess is in the shape of a channel, and the pivotal plate 754 closes the mouth of the channel. After the recess receives a portion of the glasses, the pivotal plate 754 closes the channel, with its first magnetic element 750 magnetically coupled to a second magnetic element 752 at a back surface of the glasses. In FIG. 28, the pivotal plate 757 pivots from the top so that its first magnetic element 755 is magnetically coupled to a second magnetic element 757 at a back surface of the glasses. Finally, in FIG. 29, the pivotal plate 774 pivots from the bottom so that its first magnetic element 770 is magnetically coupled to a second magnetic element 772 at a bottom surface of the glasses.

There can be more than one pair of magnetic elements when a light assembly of the present invention is attached to a pair of glasses. In FIG. 30, the engaging recess has an inverted U-shape structure, with two magnetic elements 800 and 802. Assume that the recess is engaged to an end-piece of the glasses. There can be two magnetic elements in the end-piece of the glasses, one 804 on its front surface and one 806 on its back surface. When the end-piece is engaged to the recess, the two first magnetic elements 800 and 802 are magnetically coupled to the two second magnetic elements 804 and 806, respectively.

A number of embodiments have been described regarding magnetic coupling. In one embodiment, one or more additional stubs are used to further secure the attachment. One such embodiment is shown, for example, in FIG. 31. The glasses have two holes 850 and 852, and the light assembly has two stubs 854 and 856 located in an engaging recess area. When the light assembly is attached to the pair of glasses, the two stubs in the recess can be inserted into and engage with the two holes defined in the pair of glasses.

Figure 32A:
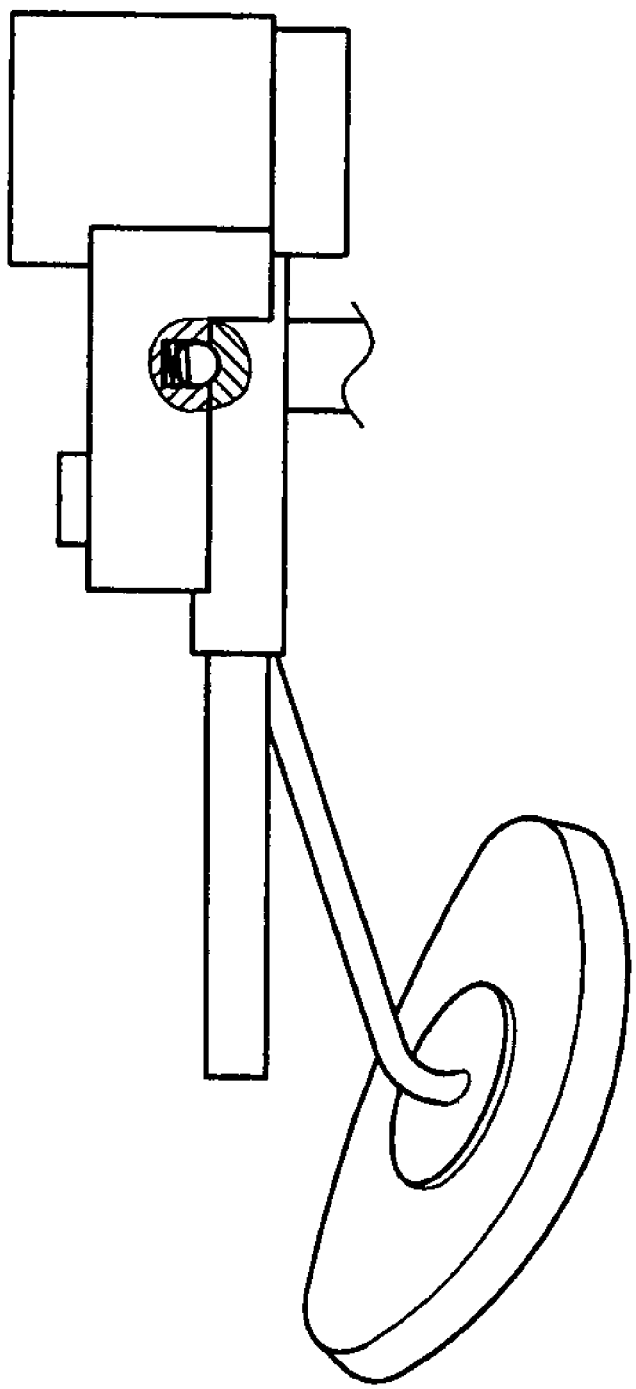
FIGS. 32A–B show an embodiment of a light assembly that has metallic balls for positioning a pair of glasses in accordance with the present invention
Figure 32B:
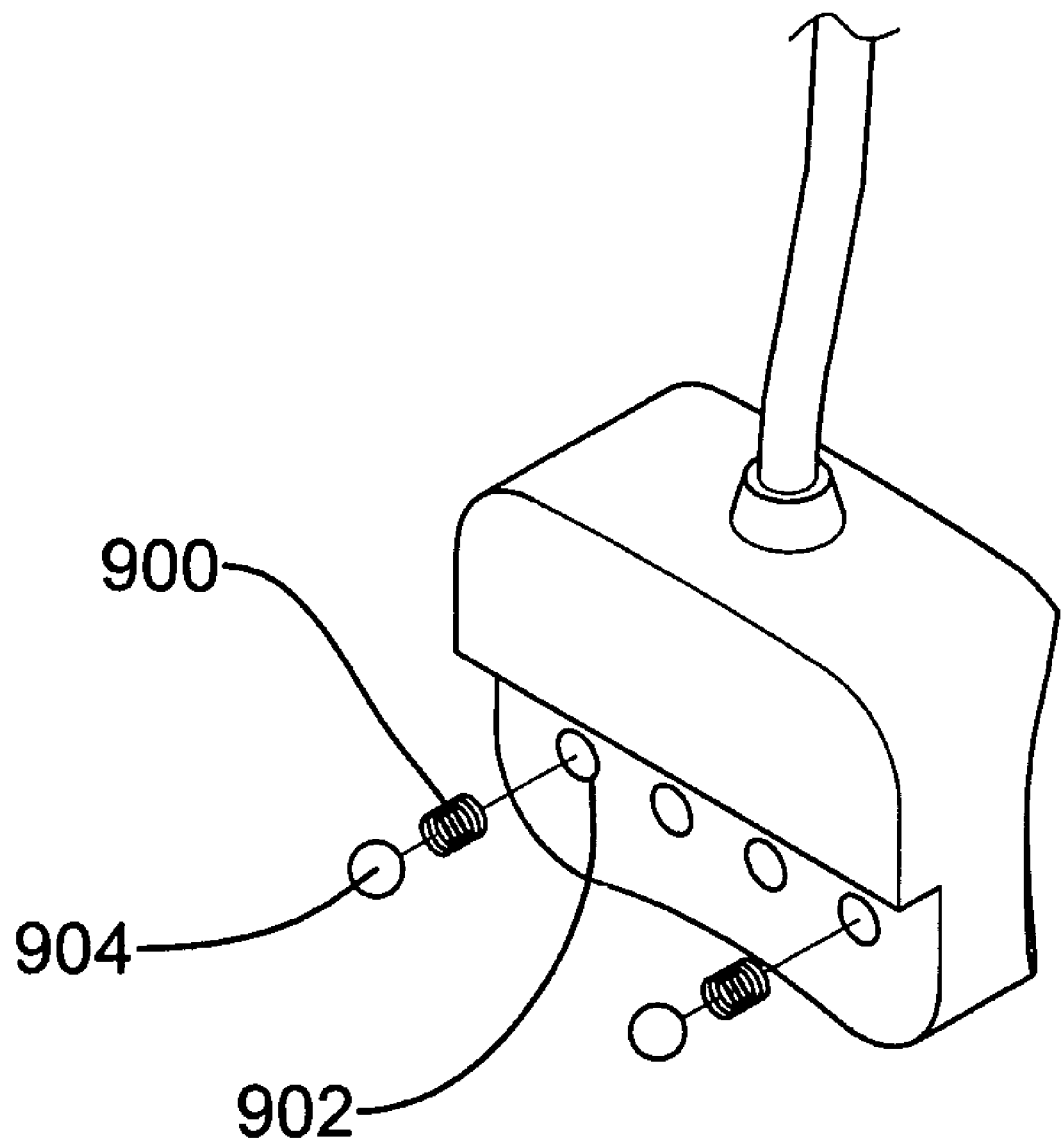

In yet another embodiment, there can be positioning mechanisms to align the light assembly to the glasses. One such embodiment is shown in FIGS. 32A–B. Each positioning mechanism includes a ball 904, such as a steel ball, held in a cavity 902 in the recess of the light assembly. Each positioning mechanism also includes a corresponding hole or indentation in a pair of glasses. Behind the ball 904, there can be a spring 900 to press onto the ball. The two holes in the glasses can serve as the positioning holes to receive the two balls. When the light assembly is attached to the glasses, with the two holes capturing the two balls, the light assembly is correctly positioned to the glasses. In one embodiment, the two holes 850, 852 in FIG. 31 serve as the positioning holes.

Figure 33:
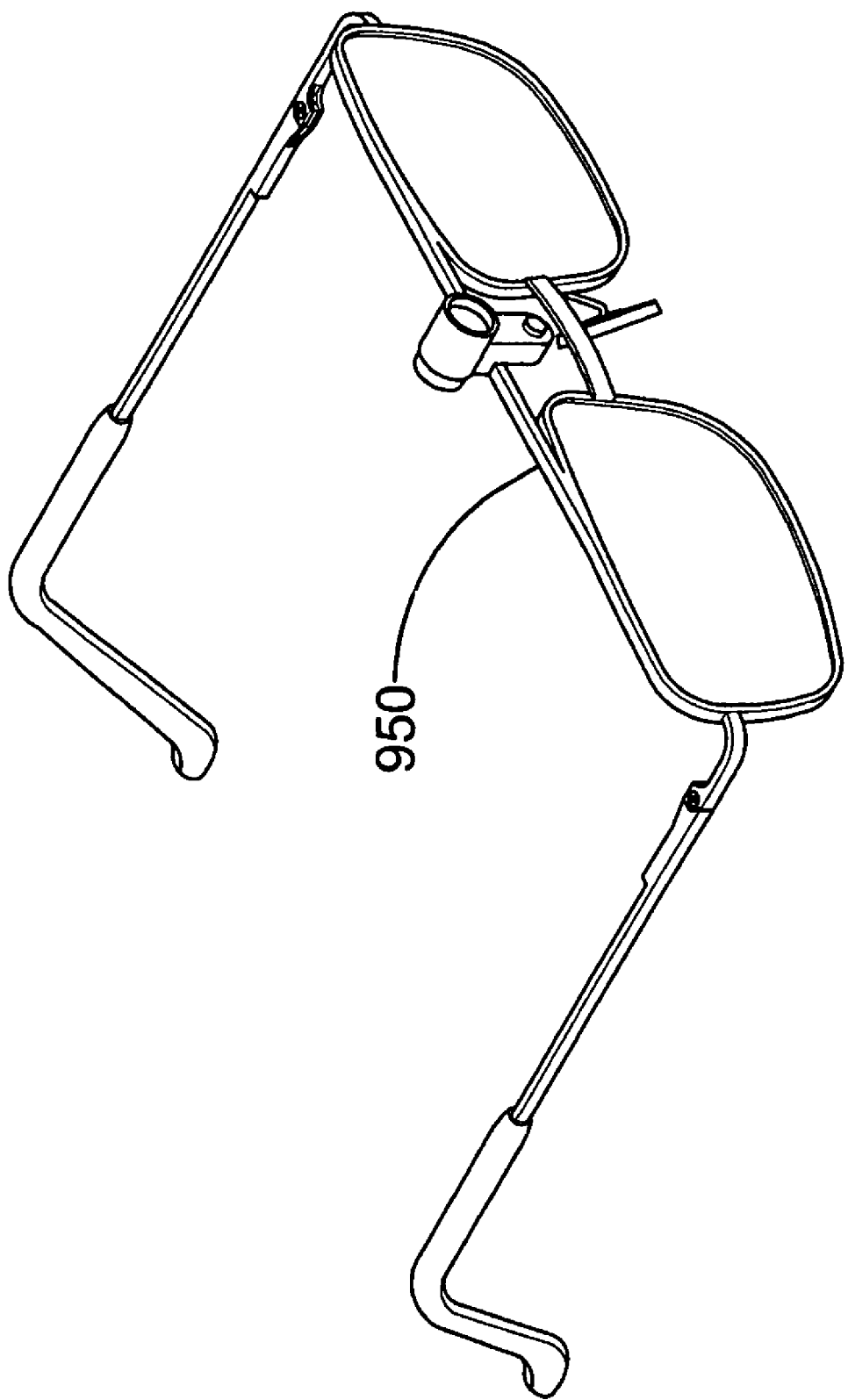
FIGS. 33–34 shows different embodiments of light assemblies attached to glasses with magnetic elements in accordance with the present invention.
Figure 34:
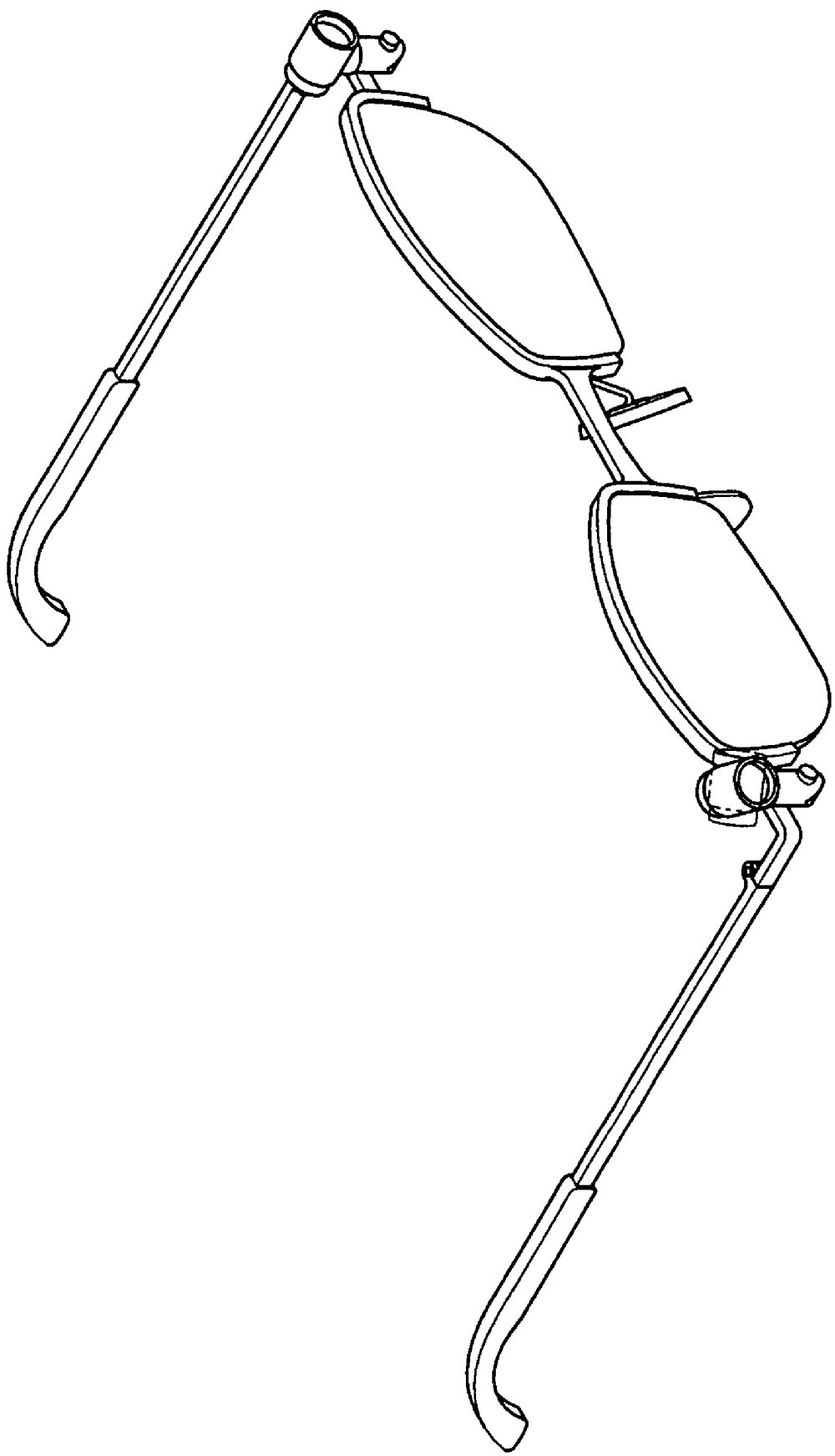

FIGS. 33 and 34 show different embodiments of previously described light assemblies attaching to different areas of the glasses, such as to its bridge, end-piece, its arm, or a mounting frame 950 extending between the two lenses of a pair of glasses. The light assemblies can be conveniently detached from the glasses when the light assemblies are not required.

A number of embodiments have been described where the invented light assembly is mounted in the general vicinity of the front surface area of a pair of glasses. In one embodiment, the assembly is attached to an arm 95 of the glasses. However, when the assembly is attached, the head of the person wearing the glasses still would not block the light emitted from the light assembly. This can be accomplished, for example, by having the neck 50 of the light source 11 extended sufficiently forward, or the light bulb assembly having a configuration that is long enough so that the person's head would not block the emitted light.

A number of embodiments have been described where the light assembly can be magnetically attached to a pair of standard glasses, without modifying the glasses. In a number of embodiments, the glasses have magnetic elements embedded. In one embodiment, the magnetic elements embedded in the glasses serve other purposes, such as for attaching auxiliary frames or shades to the pair of glasses.

A number of embodiments have been described where the light assembly includes a light source and a housing. In one embodiment, the light source is in the housing.

The various embodiments, implementations and features of the invention noted above can be combined in various ways or used separately. Those skilled in the art will understand from the description that the invention can be equally applied to or used in other various different settings with respect to various combinations, embodiments, implementations or features provided in the description herein.

Although the invention has been explained in relation to its different embodiment, it is to be understood that many other possible modifications and variations can be made without departing from the spirit and scope of the invention as hereinafter claimed.

What is claimed is:

1. A light assembly adapted to clamp on a pair of glasses, the light assembly comprising:
   a light source; and
   a housing, connected to the light source, comprising a clamp with a passage to be adapted to securely receive part of the pair of glasses within the passage so as to make the light assembly detachably attach on the pair of glasses,
   wherein the housing has a face; and
   the housing comprises
      an L-shaped clamp pivotally mounted on the face of the housing and
      a seat on the face of the housing to form the passage between the face of the housing, the L-shaped clamp and the seat.

2. A light assembly adapted to clamp on a pair of glasses, the light assembly comprising:
   a light source; and a housing, connected to the light source, comprising a clamp with a passage to be adapted to securely receive part of the pair of glasses within the passage so as to make the light assembly detachably attach on the pair of glasses, wherein the light source comprises a light bulb assembly connected to a flexible neck.

3. The light assembly as claimed in claim 2 further comprising a switch on the housing; and a power supply in the housing.

4. The light assembly as claimed in claim 2, wherein a flexible tube is connected between the light bulb assembly and the housing.

5. The light assembly as claimed in claim 1, wherein the L-shaped clamp has a distal end and a magnetic element secured on the distal end of the L-shaped clamp; and the seat further has at least one metallic block to correspond to the magnetic element.

6. The light assembly as claimed in claim 1, wherein the L-shaped clamp is pivotally mounted on the face of the housing by a pin; and a spring surrounds around the pin.

7. The light assembly as claimed in claim 1, wherein the L-shaped clamp has a distal end and a hook formed on a distal end of the L-shaped clamp; and the seat has a bottom and a detent defined in the bottom of the seat to correspond to the hook.

8. The light assembly as claimed in claim 2, wherein the light source has a bottom, and the housing is attached to the bottom of the light source.

9. A magnetically attachable light assembly for a pair of glasses comprising:
   a housing including a power source and a first magnetic element; and
   a light source connected to the housing;
   wherein
      the power source provides energy to the light source; and
      when the light assembly is attached to the pair of glasses,
      the first magnetic element is magnetically coupled to a second magnetic element;
      a person wearing the glasses would not block the light emitted from the light source; and
      at least a portion of the housing extends over at least a portion of the glasses to provide support for the light assembly.

10. A magnetically attachable light assembly as recited in claim 9 further comprising
   a securing mechanism that includes the second magnetic element;
   wherein when the light assembly is attached to the pair of glasses, the securing mechanism is secured to the frame of the glasses for attaching the light assembly to the pair of glasses.

11. A magnetically attachable light assembly as recited in claim 10 wherein
   the securing mechanism includes a clamp; and
   when the light assembly is attached to the pair of glasses, the clamp holds onto at least a portion of the glasses.

12. A magnetically attachable light assembly as recited in claim 9 wherein
   the second magnetic element is in a securing mechanism; and
   when the light assembly is attached to the pair of glasses, the securing mechanism is secured to the frame of the glasses.

13. A magnetically attachable light assembly as recited in claim 9 wherein the second magnetic element is in the glasses.

14. The light assembly as claimed in claim 9, wherein only one light source is connected to the housing.

15. The light assembly as claimed in claim 9, wherein the light assembly is adapted to attach to a bridge of the pair of glasses.

16. The light assembly as claimed in claim 9, wherein the light assembly is adapted to attach to an end-piece of the pair of glasses.

17. The light assembly as claimed in claim 9, wherein the light assembly is adapted to attach to an arm of the pair of glasses.

18. The light assembly as claimed in claim 9, wherein the light assembly is adapted to attach to a mounting frame between two pieces of lenses of the pair of glasses.

19. A light assembly adapted to clamp on a pair of glasses, the light assembly comprising:
   a light source; and
   a housing connected to the light source,
   wherein the housing includes a clamp pivotally mounted on the housing,
   wherein the housing includes a magnetic element,
   wherein based on at least the clamp and the magnetic element, the housing forms a passage to securely receive at least a part of the pair of glasses within the passage so as to attach the light assembly on the pair of glasses, and
   wherein the light assembly is detachable from the pair of glasses based on at least the magnetic element and the clamp.

* * * * *